US008913149B1

(12) United States Patent  
Georges, III

(10) Patent No.: US 8,913,149 B1
(45) Date of Patent: Dec. 16, 2014

(54) APPARATUS AND TECHNIQUES FOR ENHANCED RESOLUTION IMAGING

(75) Inventor: James A. Georges, III, Brighton, MI (US)

(73) Assignee: Integrity Applications Incorporated, Carlsbad, CA (US)

(*) Notice: Subject to any disclaimer, the term of this patent is extended or adjusted under 35 U.S.C. 154(b) by 363 days.

(21) Appl. No.: 13/308,110

(22) Filed: Nov. 30, 2011

Related U.S. Application Data

(60) Provisional application No. 61/418,388, filed on Nov. 30, 2010.

(51) Int. Cl.
| | |
|---|---|
| H04N 5/228 | (2006.01) |
| G06K 9/32 | (2006.01) |
| G02B 27/10 | (2006.01) |
| G01B 9/02 | (2006.01) |
| G06T 3/40 | (2006.01) |
| H04N 5/232 | (2006.01) |

(52) U.S. Cl.
CPC .......... *H04N 5/23232* (2013.01); *G06T 3/4053* (2013.01); *G01B 9/02043* (2013.01)
USPC .......... 348/222.1; 348/343; 382/299; 356/456

(58) Field of Classification Search
CPC .............. H04N 5/232; H04N 5/23238; H04N 5/23232; H04N 9/097; G01B 9/0203; G01B 9/02042; G01B 9/02043; G02B 27/4227; G06T 3/4053; G06T 3/4061
USPC ............... 348/218.1, 266, 343; 356/456, 310; 250/550, 559.11, 227.2; 382/299
See application file for complete search history.

(56) References Cited

U.S. PATENT DOCUMENTS

| | | |
|---|---|---|
| 6,219,435 B1 | 4/2001 | Horikoshi et al. |
| 6,281,994 B1 | 8/2001 | Horikoshi et al. |
| 6,982,817 B1 | 1/2006 | Halldorsson |
| 6,999,178 B2 * | 2/2006 | Hanson et al. ................ 356/484 |

(Continued)

FOREIGN PATENT DOCUMENTS

DE    10 2005 023743    5/2005

OTHER PUBLICATIONS

Karaman et al.; "Synthetic Aperture Imaging for Small Scale Systems"; May 1995; IEEE Transactions on Ultrasonics, Ferroelectrics; and Frequency Control; vol. 42, No. 3; pp. 429-442.*

(Continued)

*Primary Examiner* — John Villecco
(74) *Attorney, Agent, or Firm* — Knobbe Martens Olson & Bear LLP

(57) ABSTRACT

Disclosed are systems and methods for synthesizing a high resolution image associated with a large imaging aperture using an optical imaging apparatus having a smaller aperture. In certain implementations, introduction of a coherent homodyne reference beam to a coherent imaging of an object can result in formation of a Fourier space side lobe that includes information about a portion of a spectrum representative of the object's Fourier spectrum. Images can be obtained at a number of different orientations to yield a number of such side lobe images so as to allow construction of the object's spectrum. A synthesized image corresponding to such a constructed spectrum can have an improved resolution that exceeds the performance limit imposed by the aperture of the optical imaging apparatus.

29 Claims, 32 Drawing Sheets

(56) References Cited

U.S. PATENT DOCUMENTS

| | | | | |
|---|---|---|---|---|
| 7,119,905 | B2* | 10/2006 | Bingham et al. | 356/484 |
| 7,839,548 | B2 | 11/2010 | Schwerdtner | |
| 7,924,430 | B2 | 4/2011 | Georges, III | |
| 8,405,059 | B2* | 3/2013 | Heintzmann et al. | 250/550 |
| 8,433,158 | B2* | 4/2013 | Menon | 382/299 |
| 2006/0192972 | A1* | 8/2006 | Bingham et al. | 356/458 |
| 2007/0113012 | A1 | 5/2007 | Cable et al. | |
| 2008/0198431 | A1 | 8/2008 | Schwerdtner | |
| 2009/0086296 | A1 | 4/2009 | Renaud-Goud | |
| 2009/0285463 | A1* | 11/2009 | Otazo et al. | 382/131 |
| 2010/0008597 | A1* | 1/2010 | Findlay et al. | 382/275 |
| 2010/0014136 | A1 | 1/2010 | Haussler et al. | |
| 2010/0033784 | A1 | 2/2010 | Renaud-Goud | |
| 2010/0110208 | A1* | 5/2010 | Gerwe | 348/222.1 |
| 2011/0032337 | A1 | 2/2011 | Ramos et al. | |
| 2011/0085051 | A1* | 4/2011 | Chi et al. | 348/222.1 |
| 2011/0304723 | A1* | 12/2011 | Betzig | 348/79 |
| 2012/0162448 | A1* | 6/2012 | Au et al. | 348/208.4 |
| 2013/0286181 | A1* | 10/2013 | Betzig et al. | 348/79 |
| 2014/0153692 | A1* | 6/2014 | Larkin et al. | 382/132 |

OTHER PUBLICATIONS

James A. Georges, III "Optical spatial heterodyne interferometric Fourier transform technique (OSHIFT) and a resulting interferometer", Advance Wavefront Control: Methods, Devices, and Applications V, Proc. of SPIE vol. 6711, pp. 671104-1-671104-12, 2007.

Aerial 3D Display, obtained from the website http://burton-jp.com/en/index.htm on Feb. 16, 2102.

Buell, W.F., et. al., "Synthetic-Aperture Imaging Ladar," Crosslink Summer, pp. 45-59, Aug. 2004.

Beck, S.M. et. al., "Synthetic-aperture imaging laser radar: laboratory demonstration and signal processing," Applied Optics, vol. 44, No. 35, pp. 7621-7629, Dec. 10, 2005.

Buell, W. et. al., "Demonstration of Synthetic Aperture Imaging Ladar," Laser Radar Technology and Applications X, edited by Gary W. Kamerman, Proc. of SPIE, vol. 5791, pp. 152-166, 2005.

Bashkansky, M., et. al., "Two-dimensional synthetic aperture imaging in the optical domain," Optics Letters, vol. 27, No. 22, pp. 1983-1985, Nov. 15, 2002.

Bashkansky, M., et. al., "Synthetic aperture imaging at 1.5 micron: Laboratory demonstration and potential application to planet surface studies," Highly innovative space telescope concepts edited by H.A. MacEwen, Proc. of SPIE, vol. 4849, pp. 48-56, 2002.

Lucke, R.L., et. al., "Photon-limited synthetic-aperture imaging for planet surface studies," Applied Optics, vol. 41, No. 24, pp. 5084-5095, Aug. 20, 2002.

Marcus, S., "Solid-state laser synthetic aperture radar," Applied Optics, vol. 33, No. 6, pp. 960-964, Feb. 20, 1994.

Rabb, D., et. al., "Distributed aperture Synthesis," Optics Express, vol. 18, No. 10, pp. 10334-10342, May 10, 2002.

Stafford, J.W., et. al., "Experimental demonstration of stripmap holographic aperture ladar system," Applied Optics, vol. 49, No. 12, pp. 2262-2270, Apr. 20, 2010.

Duncan, B.D., et. al., "Stripmap Holographic Aperture Ladar," 21st Annual Meeting of the IEEE Lasers and Electro-Optics Society, LEOS 2008, pp. 511,512, Nov. 9-13, 2008.

Marron, J.C., et. al., "Distributed Aperture Active Imaging," Laser Radar Technology and Applications XII edited by Monte D. Turner and Gary W. Kamerman, Proc. of SPIE, vol. 6550, pp. 65500A-1-65500A-7, 2007.

Christopher Drew, "Drones are weapons of choice in Fighting Qaeda," The New York Times (http://www.nytimes.com/2009/03/17/business/17uav.html?_r=1), Mar. 17, 2009.

Gaskill J.D., "Linear Systems, Fourier Transforms, and Optics", John Wiley & Sons, Inc., New York 1978, pp. 199-202.

Goodman J.W., "Introduction to Fourier Optics", 2nd edition, McGraw-Hill, New York. 1996, pp. 5, 9, 308-309.

Marcel J. E. Golay, "Point Arrays Having Compact, Nonredundant Autocorrelations," J. Opt. Soc. Am. 61, 272-273 1971.

Sarah J. Purewal, "Holographic TV Coming Your Way in 2017," obtained from http://www.techhive.com/article.209772/Holographic_TV_Coming_Your_Way_in_2017.html, Nov. 4, 2010.

Dillow, "New Holographic Device Can Record and Display 3-D Holograms in Near Real Time", posted Nov. 3, 2010, http://www.popsci.com/technology/article/2010-11, pp. 1-6.

Horton, "Air Force backing UA's hologram development", Feb. 9, 2008, http://tucsoncitizen.com/morgue/2008/02/09/76478-air-force-backing-ua-s-hologram-development.

Zebra Imaging—http://en.wikipedia.org/wiki/Zebra Imaging, pp. 1-3.

Saenz, "3D Hologram Prints Invade Military, Commercial Design", posted Dec. 16, 2010, http://singularityhub.com/2010/12/16/3d-hologram-prints-invade-military-commercial-design, pp. 1-6.

"Overview of Current Methods of 3D Display," obtained from the website http://www.holovision.com.

"HolovisionTM: Three-Dimensional Display Without Special Eyewear," obtained from the website http://www.holovision.com.

Benzie, P., "A Survey of 3DTV Displays: Techniques and Technologies," Circuits and Systems for Video Technology, IEEE Transactions on, vol. 17, No. 11, pp. 1647,1658, Nov. 2007.

"White Paper: Glasses-Free 3D vs 3D Holographic: Provision to the Rescue," obtained from the website http://provision.tv/plugins/tinymce/plugins/filemanager/files/Glasses%20Free%/203D%20vs%203D%20Holographic.pdf.

Ozaktas, H.M. and Onural L., "Signals and Communication Technology: Three-Dimensional Television," pp. 471-503, 2007, Chapter 13—Solving the 3D Problem.

Carlos A. Soto, "5 Technologies Changing our World," Washington Technology, Apr. 5, 2011.

David H. Freeman, "Future Tech: Looking Forward to the Post-Screen Era," Mar. 2011 issue of Discover Magazine.

* cited by examiner

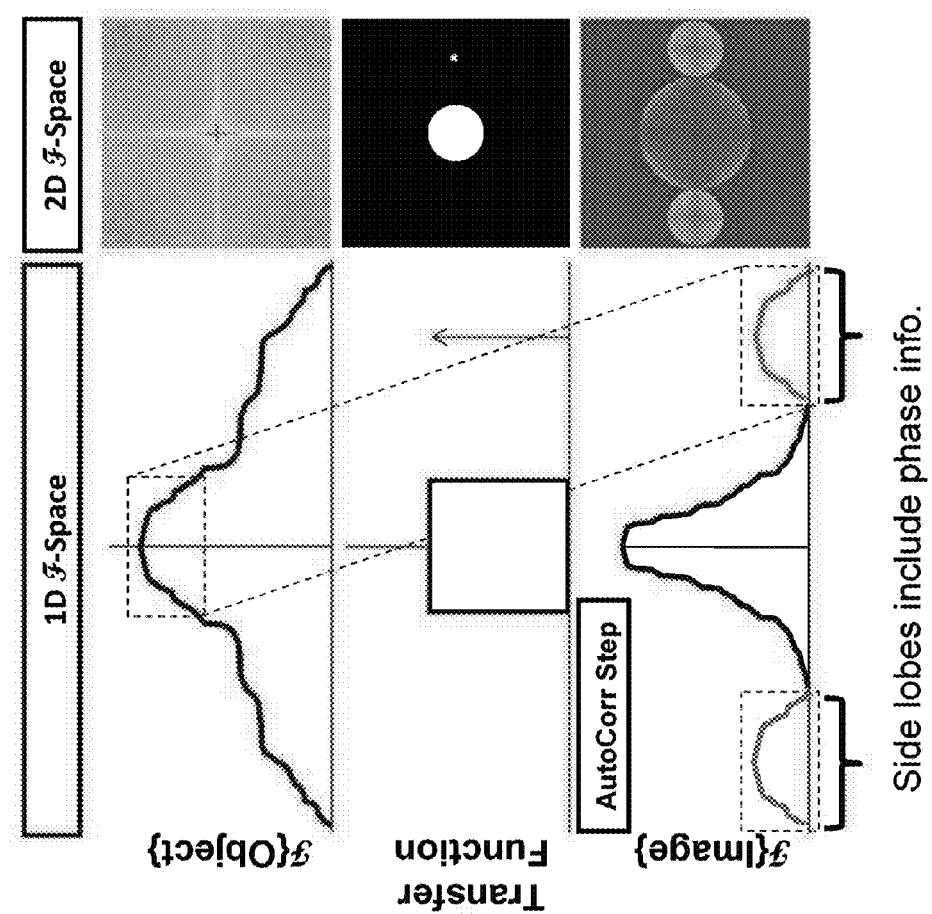

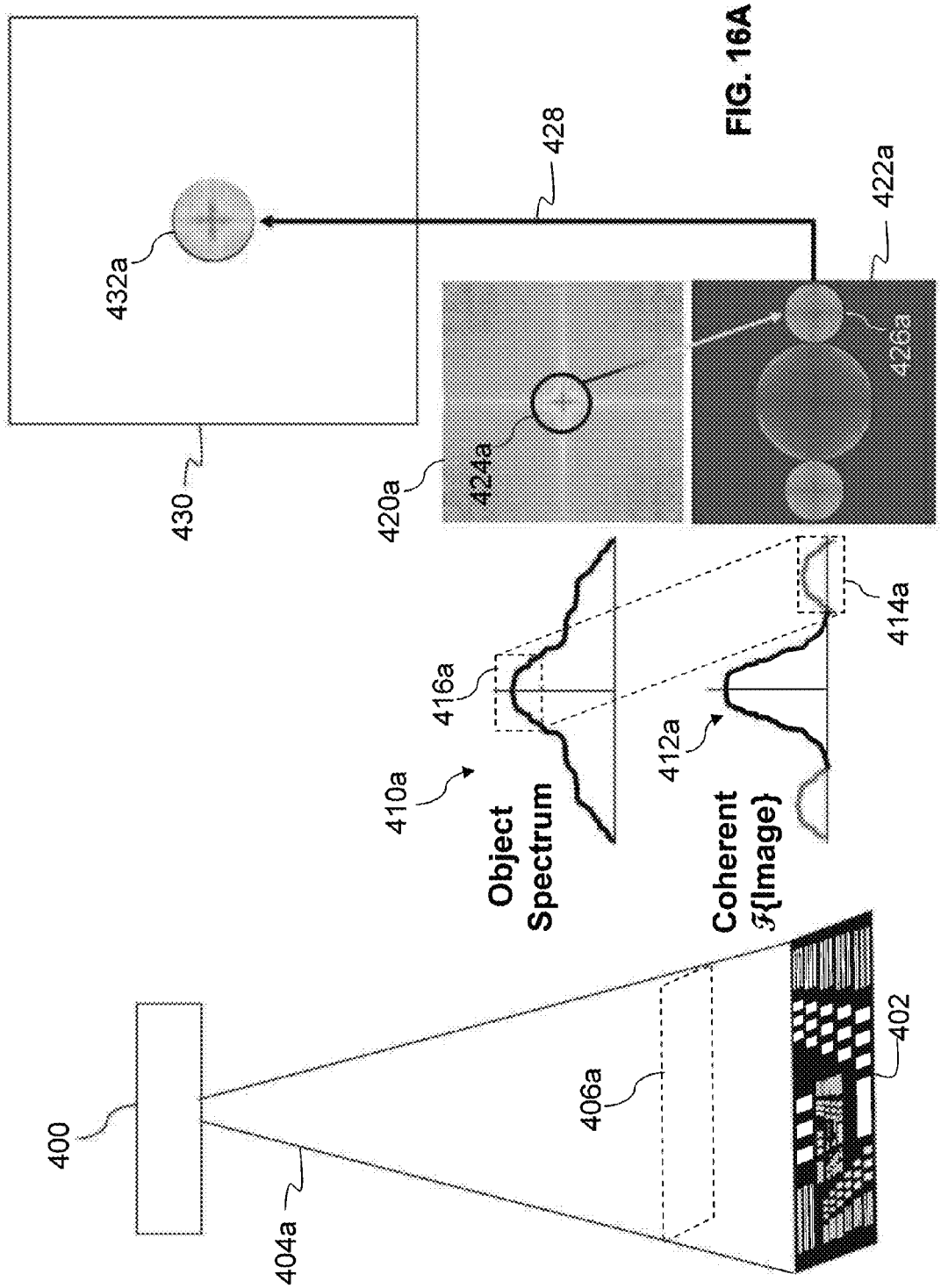

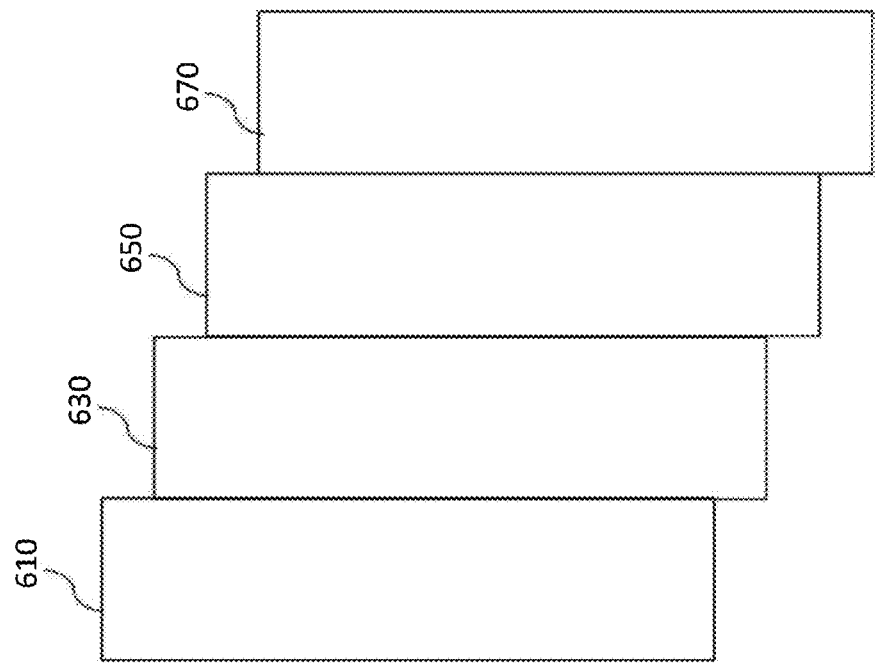
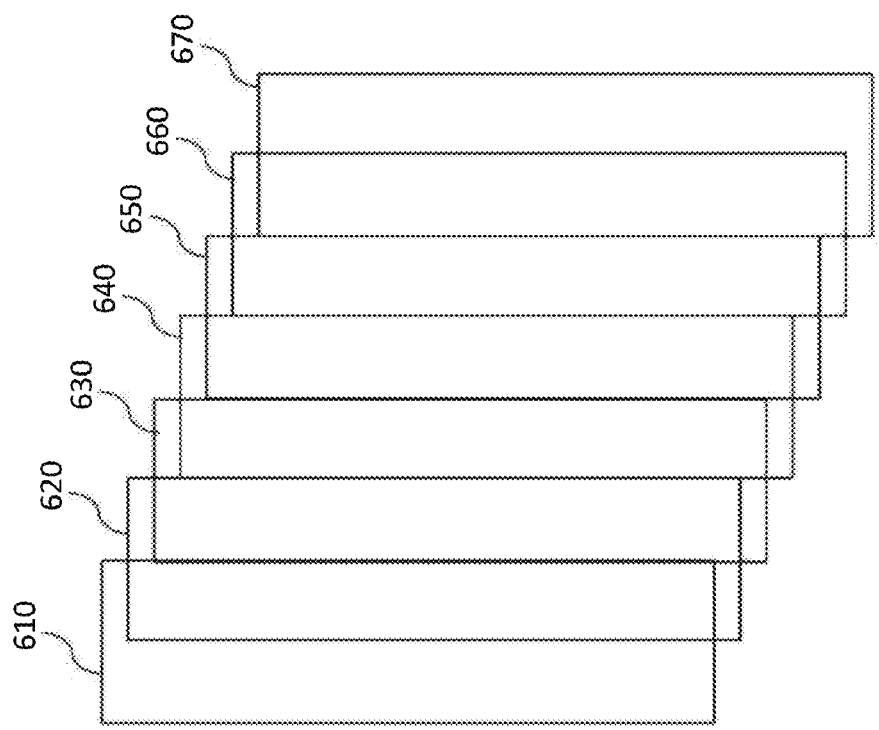

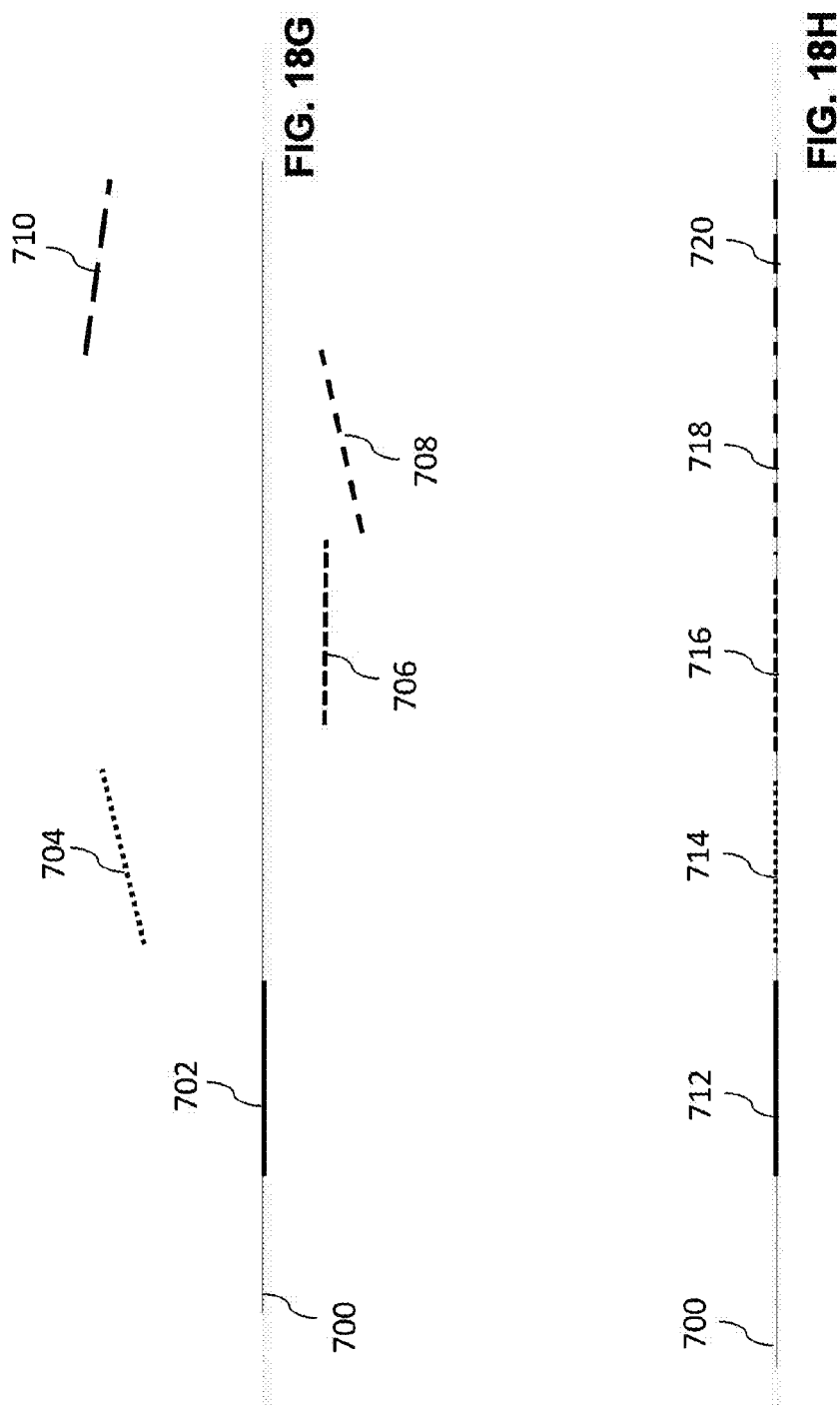

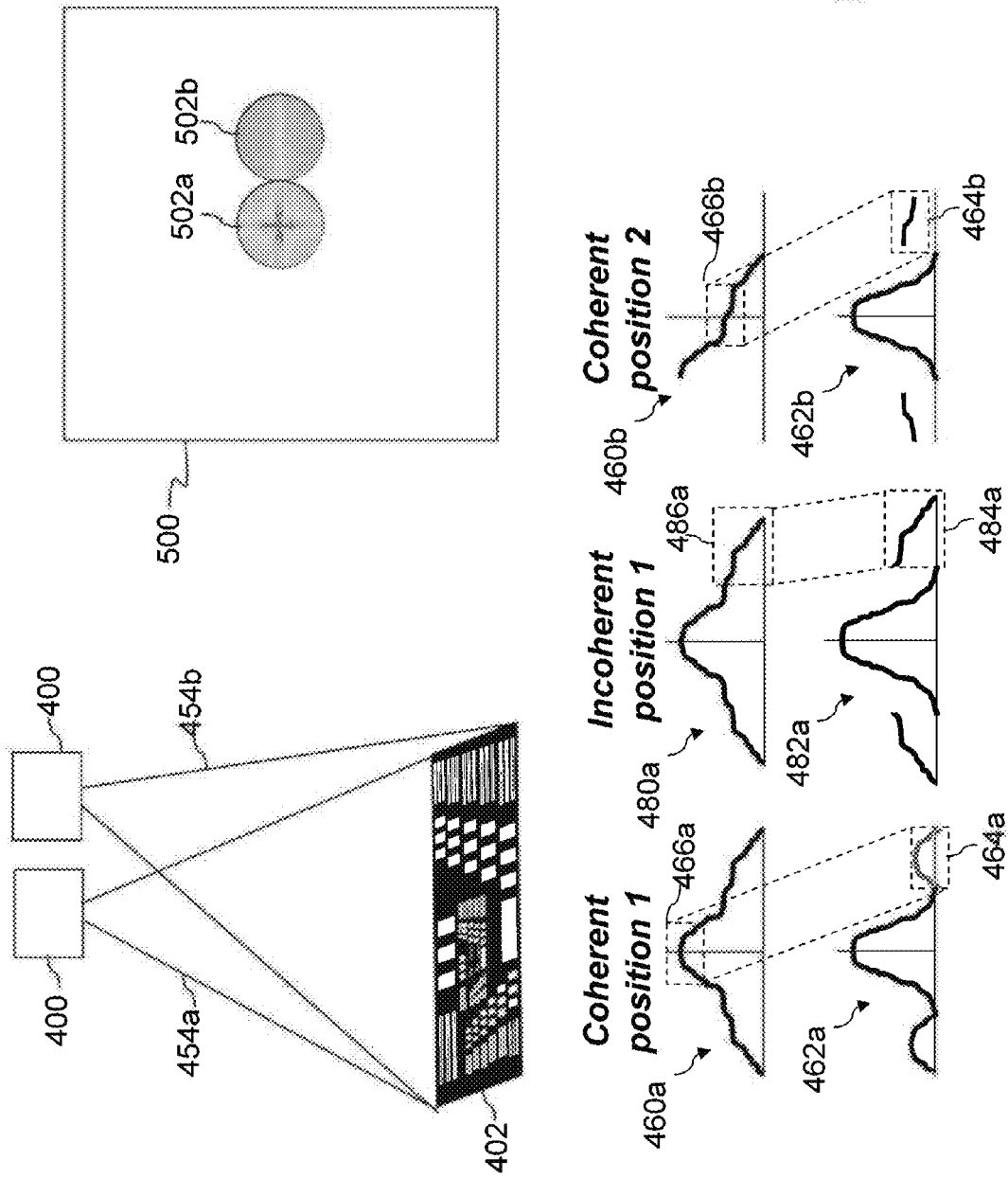

APPARATUS AND TECHNIQUES FOR ENHANCED RESOLUTION IMAGING

PRIORITY CLAIM

This application claims the benefit of priority of U.S. Provisional Patent Application No. 61/418,388, entitled "SYNTHETIC APERTURE IMAGING AIDED BY OPTICAL SPATIAL HOMODYNING APPLICATIONS," filed Nov. 30, 2010, which is hereby incorporated herein by reference in its entirety to be considered part of this specification.

BACKGROUND

1. Field

The present disclosure generally relates to the field of imaging, and more particularly, to high-resolution imaging attained, for example, using synthetic aperture imaging aided by optical spatial homodyning systems and methodologies.

2. Description of the Related Art

High resolution images offer increased information content and consequently enhanced image quality. In typical optical systems, higher resolution can be obtained by enlarging the size of the aperture. However, a large aperture generally means a larger system. In contrast, a compact systems are often desirable for a variety of reasons. Housing a smaller system can be easier. Smaller systems also generally weigh less. Accordingly, storage, maneuverability, and transport of smaller systems is often improved. Obtaining a high-resolution image associated with a large aperture with a more practical small-aperture device is thus desirable in various cases.

SUMMARY

In various, although not necessarily all, embodiments disclosed herein, a larger collective synthetic aperture is obtained by collecting information from a plurality of smaller aperture images. Increased resolution may thus be achieved in some cases.

In some embodiments, for example, a plurality of complex images are obtained and combined to create an image having increased resolution. The complex images may be obtained by interfering a beam of light reflected from an object with another beam. The complex images, including the fringes from the interference, are obtained at an image plane where the object is imaged. The combined beams form an image that when recorded encode the complex information on spatial fringes. The intensity information is processed to decoded and yield the complex image. A plurality of such complex images obtained under different conditions, e.g. from different vantage points, can be combined to yield a higher resolution image.

Various embodiments described herein relate to a method of producing an image. The method includes obtaining information relating to a first complex image of an object at a first orientation wherein the first complex image results from mixing of a first coherent imaging beam obtained through an aperture and a coherent reference beam at an image plane. The method further includes obtaining information relating to a second complex image of the object at a second orientation that is different than the first orientation wherein the second complex image results from mixing of a second coherent imaging beam obtained through the aperture and a coherent reference beam at the image plane. The information from the first and second complex images is used to form a synthetic aperture image having higher resolution than the first and second complex images.

In some embodiments, obtaining information relating to the first and second complex images comprises extracting information from the first and second complex images from side lobes in frequency space associated with the first and second complex images. In some embodiments, obtaining information relating to the first and second complex images comprises extracting information from the first and second complex images from side lobes in Fourier space associated with said first and second complex images.

In various embodiments, at least one of the actions recited is performed by one or more processors. Certain embodiments include one or more non-transitory computer readable media comprising computer instructions configured to cause one or more computer processors to perform at least one of the actions recited.

Various embodiments described herein relate to a method of imaging. In this method a collective image is formed by providing an illumination beam to an object so as to yield interaction light resulting from interaction between the illumination beam and the object. At least some of the interaction light is directed as an imaging beam to an imaging sensor so as to form an image of the object on the imaging sensor. At least a portion of the interaction light is interfered with a reference beam thereby forming a spatial interference pattern imaged on the image sensor. The interference pattern combines with the image of the object at the imaging sensor to form the collective image having a Fourier transform that includes a side lobe in Fourier space. The side lobe has phase information about a range of the object's spatial frequencies. This method further comprises repeating the forming at different orientations between the imaging beam and the object until a plurality of collective images are obtained, each of the collective images having a different range of the object's spatial frequency.

Some embodiments further comprise generating and extracting a side lobe to yield a sub-aperture for each of the plurality of collective images. The generating of the side lobe may comprise applying a Fourier transform to the collective image. The method may further comprise combining the sub-apertures to yield a synthesized aperture. An intensity image corresponding to the synthesized aperture may also be generated. The intensity image may have a resolution that exceeds the resolution capability associated with each sub-aperture. Each of the sub-apertures resulting from the collective images may overlap with one or more of its neighboring sub-apertures. In some embodiments, combining comprises selecting a first sub-aperture, identifying a region of overlap in phases of the first sub-aperture and a second sub-aperture, calculating a difference in the phases within the region of overlap, and adjusting the phase of the second sub-aperture based on the calculated difference to yield an adjusted phase for the second sub-aperture that is substantially in phase with the first aperture. The combining can further comprises repeating the identifying, calculating, extrapolating and adding with one or more sub-apertures relative to one or more of the first and second sub-apertures. The combining can further comprise selecting phase-adjusted sub-apertures that represent substantially contiguous ranges of the object's spatial frequency to form the synthesized aperture.

In some embodiments, the illumination beam comprises a coherent light beam. The coherent light beam can comprise a laser beam. The laser beam can includes a frequency in a visible spectrum.

In some embodiments, the reference beam comprises a coherent light beam. The reference beam can originate from a source that also generates the illumination beam. The reference beam can be separated from the illumination beam and provided to the imaging sensor. The reference beam can originate from the interaction light.

In some embodiments, the different orientations between the imaging beam and the object is introduced by moving an aperture that the imaging beam passes through along a direction having a lateral component relative to the imaging beam's optical axis. In some embodiments, the different orientations between the imaging beam and the object result from rotating the object relative to the imaging beam. In some embodiments, the different orientations between the imaging beam and the object result from moving a platform on which the image sensor is disposed.

In some embodiments, the method further comprises recording the plurality of collective images so as to allow subsequent retrieval and analysis of the collective images. In some embodiments, interaction between the illumination beam and the object comprises reflection of the illumination beam from the object.

In some embodiments, at least one of the actions recited is performed by one or more processors. Some embodiments comprise one or more non-transitory computer readable media comprising computer instructions configured to cause one or more computer processors to perform at least one of the actions recited.

Various implementations disclosure herein comprise an imaging system, comprising a coherent light source, an optics assembly, and an imaging sensor. The coherent light source is configured to generate an illumination beam. The optics assembly is configured to deliver the illumination beam from the coherent light source to an object and to gather interaction light from interaction between the illumination beam and the object and form an image of the object. The imaging sensor is positioned and configured to allow recording of the image. The optics assembly is further configured to provide a reference beam to the image sensor. The reference beam combines with the image of the object at the imaging sensor to form a collective image having a Fourier transform that includes a side lobe in Fourier space. The side lobe has phase information about a range of the object's spatial frequency.

In some embodiments, system further comprises a non-transitory computer readable medium configured to allow storage of the collective images. In some embodiments, the imaging system further comprises a controller configured to control acquisition of a plurality of different collective images.

Some embodiments comprise a movable craft having the imaging system. The movable craft can include an aircraft, a spacecraft, a watercraft, or a landcraft.

Various implementations described herein comprise a method for forming an image. The method comprises obtaining a first frequency space side lobe associated with a first image of an object obtained at a first homodyne orientation, and obtaining a second frequency space side lobe associated with a second image of the object obtained at a second homodyne orientation, wherein each of the first and second images comprises a coherent image.

In some embodiments, the first and second frequency space side lobes overlap with each other in frequency. Some embodiments further comprise obtaining a third frequency space side lobe associated with an incoherent image of the object obtained at the first homodyne orientation such that the first and third frequency space side lobes are interdependent with each other. The method can comprise using at least a portion of the third frequency space side lobe and at least a portion of the second frequency space side lobe so as to combine phase information associated with the first and second images.

In some embodiments, at least one of the actions recited is performed by one or more processors. Some embodiments may comprise one or more non-transitory computer readable media comprising computer instructions configured to cause one or more computer processors to perform at least one of the actions recited.

Various implementations described herein comprise a method for imaging comprising obtaining a first complex image of an object at a first orientation, the first complex image resulting from mixing of a first coherent imaging beam obtained through an aperture and a second coherent reference beam at an image plane, and obtaining a second complex image of the object at a second orientation that is different than the first orientation, the second complex image resulting from mixing of a second coherent imaging beam obtained through the aperture and a second coherent reference beam at the image plane. The first and second complex images are obtained such that one complex image is capable of being translated relative to the other complex image in frequency space.

In some embodiments, the first and second orientations themselves introduce the translation of one complex image relative to the other complex image. The translation can be introduced by a change in relative orientation of the first and second coherent imaging beams with respect to the object. The change in relative orientation can be introduced by a difference in lateral positions of the aperture corresponding to the first and second coherent imaging beams.

Some embodiments further comprise calculating a relative phase between the first and second complex images, and adjusting one of the first and second complex images with the relative phase so as to introduce the translation in frequency space. The calculating and the adjusting can be based substantially on self-contained information obtained from the first and second complex images. The calculating and the adjusting can be performed when the first and second orientations themselves do not introduce translation of one complex image relative to the other complex image. In some embodiments, the calculating and the adjusting can be performed when the first and second orientations differ by a tilt of the first and second coherent imaging beams relative to the object.

In some embodiments, at least one of the actions recited is performed by one or more processors. Some embodiments comprise one or more non-transitory computer readable media comprising computer instructions configured to cause one or more computer processors to perform at least one of the actions recited.

Various implementations disclosed herein comprise a method for processing image data comprising obtaining first data representative of a first complex image having a first spatial frequency range associated with an object, obtaining second data representative of a second complex image having a second spatial frequency range associated with the object, calculating a phase difference between the first and second complex images, processing the phase difference so as to yield a phase adjustment, and applying the phase adjustment to the first data so as to extend the first spatial frequency range to include at least a portion of the second spatial frequency range that was previously outside of the first spatial frequency range.

In some embodiments, the phase difference corresponds to a difference in phase in pupil space such that Fourier space lobes associated with the first and second complex images are translated relative to each other and have at least some overlap. The difference in phase in pupil space can result from a lateral motion of an imaging pupil with respect to an imaging axis.

In some embodiments, the phase difference can correspond to a difference in phase in image space. The phase difference can result from a substantially pure tilt of an imaging axis relative to the object between imaging orientations corresponding to the first and second complex images. Fourier space lobes associated with the first and second complex images can overlap substantially completely. The method can further comprise adding the phase difference to the second complex image so as to introduce a translation in Fourier space of a lobe associated with the second complex image relative to that of the first complex image, the translation in Fourier space facilitating extension of the first spatial frequency range.

In some embodiments, each of the first and second complex images are obtained by mixing of an imaging beam from the object and a coherent reference beam at an imaging plane where an imaging device is located. The imaging beam can results from reflection of a coherent illumination beam from the object. The coherent illumination beam and the coherent reference beam can be separate beams in a homodyne configuration.

In some embodiments, the method further comprises generating a third complex image corresponding to the extended first spatial frequency range. An intensity image can be generated based on the third complex image.

In some embodiments, the phase adjustment includes at least one of piston, tip, or tilt. Some embodiments further comprise using low-order Zernike polynomials to obtain the phase adjustment.

In some embodiments, at least one of the actions recited is performed by one or more processors. Some embodiments comprise one or more non-transitory computer readable media comprising computer instructions configured to cause one or more computer processors to perform at least one of the actions recited.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 15 depicts one-dimensional and two-dimensional Fourier representations of the example object and image resulting therefrom and having phase information, where the image can be obtained by coherent imaging, with homodyne.

FIG. 16A shows an example of how a first portion of information from a complex image can be constructed by extracting a side lobe of a coherent Fourier space image obtained at a first spatial homodyne orientation.

FIGS. 18A-18H show an example of how different sub-aperture images extracted from the side lobes can be matched or bootstrapped so as to allow construction of an object's spectrum that in turn can yield a high-resolution image of the object.

FIGS. 19A-19C show another example of how side lobes of the coherent Fourier space distributions can be made to be inter-dependent by coupling an incoherent side lobe obtained at a first spatial orientation with a coherent side lobe of obtained at a second spatial orientation.

DETAILED DESCRIPTION OF CERTAIN EMBODIMENTS

The headings provided herein, if any, are for convenience only and do not necessarily affect the scope or meaning of the claimed invention.

Provided herein are various examples of methodologies and systems for obtaining complex images through a given aperture and processing such images to obtain an image having an improved resolution associated with a larger aperture. Although described herein in the context of imaging in a visual spectrum, some or all of the features of the present disclosure can also be applied to non-visual ranges of the electromagnetic spectrum, including but not limited to RADAR, infrared, ultraviolet and x-ray ranges. Further, some or all of the features of the present disclosure can also be applied to other situations involving signals having amplitude and phase (e.g., acoustic signals such as ultrasound).

It will also be understood that although various examples described herein are generally in the context of spotlight and inverse-spotlight modes of image collection, one or more features of the present disclosure can also be applied in other image collection modes. Such collection modes can include, but are not limited to, stripmap mode and raster mode. In the context of the raster collection mode, scanning of an object (e.g., a scene) in a raster manner can allow for more concentrated laser power in some situations. Such a feature can be beneficial in some applications.

Figure 1:
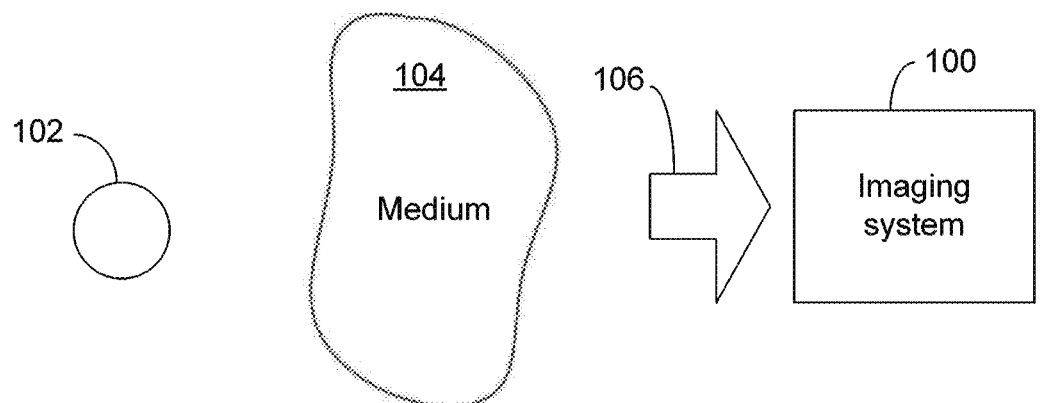
FIG. 1 schematically depicts an imaging system for imaging an object using light propagating from the object through a medium to the imaging system. The imaging system may have a synthetic aperture imaging capability facilitated, for example, by spatial homodyne techniques so as to allow formation of an improved resolution of an object and/or an improved characterization of a medium between the object and the imaging system.

FIG. 1 schematically depicts an imaging configuration where an object 102 is being imaged by an imaging system 100 using a collection of signals (arrow 106) from the object 102. The signals can pass through a medium depicted as 104. In certain implementations, the imaging system 100 can be configured to obtain a number of complex images of the object 102. Information from these images can be combined to yield a high-resolution image having a resolution that exceeds the resolution capability of each image obtained by the imaging system 100.

Figure 2:
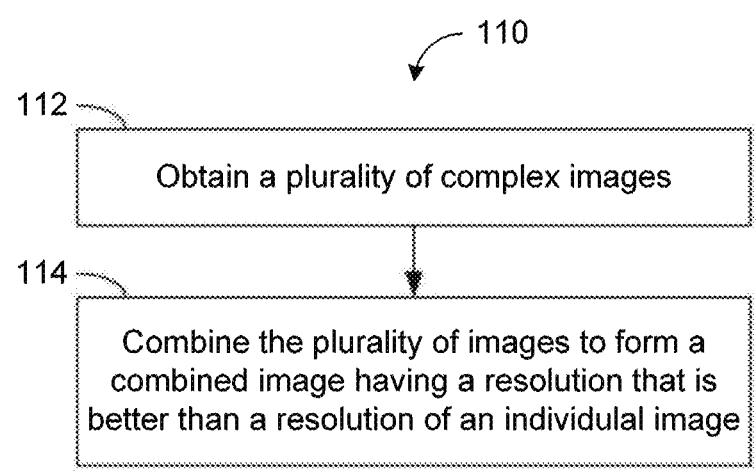
FIG. 2 shows an example process that can be implemented to facilitate one or more of the imaging capabilities of the system of FIG. 1.

FIG. 2 shows a process 110 that can be implemented to obtain the high-resolution image described above in reference to FIG. 1. In block 112, a plurality of complex images can be obtained. In block 114, such complex images can be combined to form a complex image having a resolution that is better than the resolution of an individual image. Examples of how a plurality of such complex images can be processed to yield a high-resolution image are described herein in greater detail. In some implementations, for example, these images can be transformed into frequency distributions using a transform such as a Fourier transform. Information from these distributions can be used to create a higher resolution image.

In certain implementations, complex images obtained by the imaging system 100 (FIG. 1) can include amplitude and phase information of signals from the object 102. Accordingly, a number of advantageous performance features can be realized. For example, high-resolution imaging can be achieved by combining such complex images, where the resolution of the combined image can exceed that associated with the resolution limit of the collection aperture through with an individual image is obtained. In another example, analysis and exploitation of the phase information can be implemented in a number of different situations. For example, digital signal processing can be performed to sharpen an image suffering from phase errors so as to achieve a result similar to that achievable by adaptive optics. Such sharpening of images by utilizing one or more features of the present disclosure can be achieved without the use of, for example, physical deformable mirrors or other phase modulation methods and techniques.

In reference to FIG. 1, the foregoing phase errors can be introduced by the medium 104 or even by the optical system 100. Thus, for the purpose of description herein, a complex image of an object can be understood to include effects introduced by a medium between the object and an imaging system and/or effects due to the imaging system itself. Also for the purpose of description, complex imaging or a complex image can be understood to include imaging or an image having both amplitude and phase information.

In some implementations, complex images can be obtained by mixing or interfering a beam of light from an object with a reference beam resulting in interference fringes. The fringes can be used to provide phase information for the complex images. In certain configurations, the imaging system images the object on to an imaging plane. The image plane is thus conjugate to the object plane. The object as well as the interference fringes are captured at the image plane. The mixing is thus at the image plane.

Figure 3A:
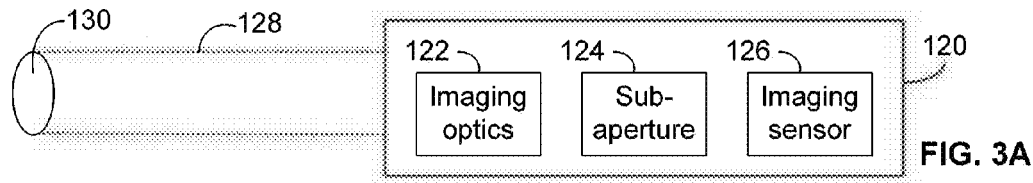
FIG. 3A shows that in certain implementations, an imaging system capable of providing a spatial homodyne (or heterodyne) functionality can include an imaging optics component, a sub-aperture component, and an imaging sensor component.

FIG. 3A shows that in certain implementations, an imaging system 120 can include a number of components that can facilitate one or more functionalities associated with obtaining and processing of complex images. The system 120 can include an imaging optics component 122 configured to allow receipt and shaping of an optical signal (e.g., beam) 128 from an object 130.

The system 120 can also include an imaging sensor component 126 configured to image the object 130 through the optics component 122. In certain embodiments, the imaging sensor 126 can include pixelated sensors or sensor array such as a CCD, a CMOS-based sensor, etc. As discussed above, in some implementations, the imaging optics 122 images the object 130 onto the sensor array 126. The sensor array 126 can thus record an image of the object 130 together with interference fringes resulting from mixing of the output signal 128 with a reference.

The system 120 can also include a component 124 configured to facilitate obtaining a number of images associated with smaller component apertures (sometimes referred to as sub-apertures). In certain implementations, such images can include complex images, with each image having at least some different information (e.g., phase and amplitude information). In certain situations, such complex images can be independent images having independent phase and amplitude information.

In certain implementations, the component 124 can be configured to facilitate obtaining of the complex images and combining such images so as to a combined image. Such a combined image can have an associated effective aperture greater than that of each sub-aperture; thus resulting in a resolution performance that exceeds the resolution achievable by each sub-aperture imaging. Such a configuration can be utilized in different imaging situations including but not limited to where an object is at a substantially fixed orientation relative to the imaging system 120. An example of such a situation is described herein in greater detail.

In other imaging situations, an object and the imaging system 120 can be at different orientations during obtaining of sub-aperture images; and such images can be processed to yield a higher resolution image. Examples of such imaging situations are described herein in greater detail.

In certain implementations, the imaging system 120 can be configured to accommodate any combinations of the foregoing examples of the imaging situations.

Figure 3B:
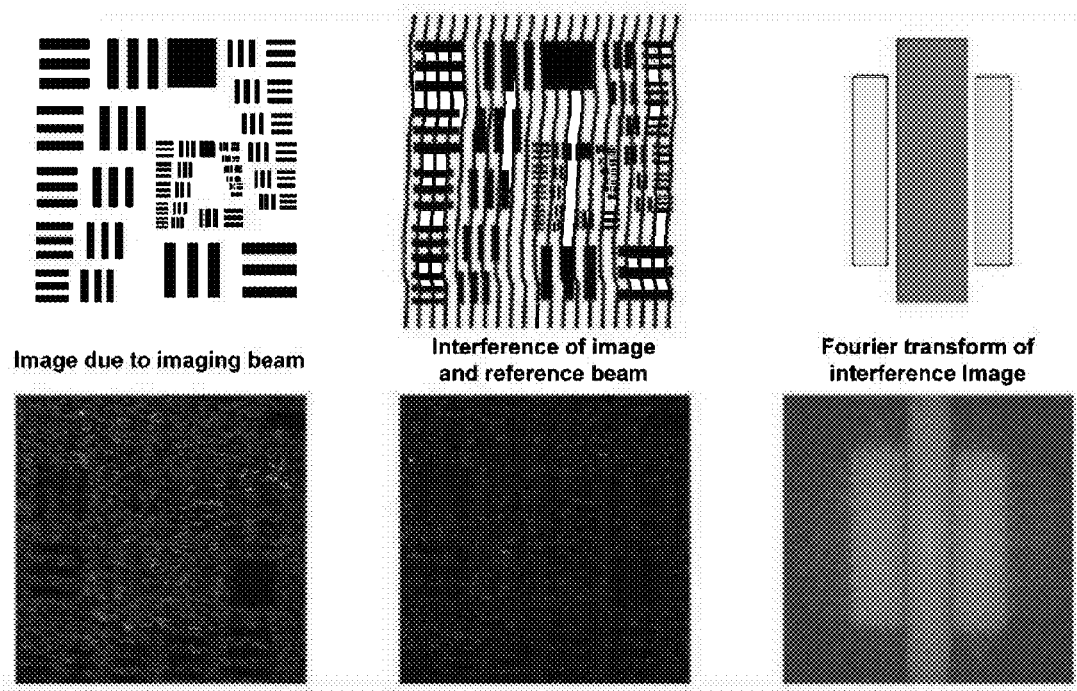
FIG. 3B shows example images of an object that can be obtained by the spatial homodyne feature of the imaging system of FIG. 3A.
Figure 3C:
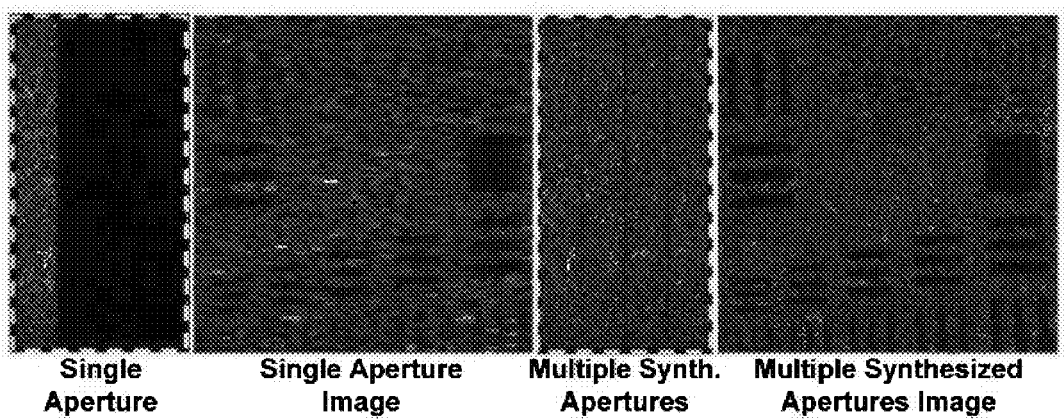
FIG. 3C shows an example of improved resolution that can be obtained by synthesizing a plurality of images obtained by the spatial homodyne technique of FIG. 3B, where the synthesizing can yield a synthetic aperture that is larger than an aperture associated with each image.

FIGS. 3B and 3C show an example of improvement in resolution that can be obtained using an imaging system having one or more features as disclosed herein, such as the system 120 described in reference to FIG. 3A. Various images and representations shown are for an example resolution chart (upper left panel in FIG. 3B) used as an object. The lower left panel of FIG. 3B and the second panel of FIG. 3C represent an intensity image obtained from a single sub-aperture. The right-most panel of FIG. 3C represents an intensity image obtained by processing multiple sub-aperture complex images. Improvement in resolution is readily apparent.

As described herein in greater detail, visual representations of some intermediate stages in signal processing steps are also shown in FIGS. 3B and 3C. In the middle column of FIG. 3B, detected images for idealized (upper panel) and actual (lower panel) interference (between the object image and phase reference beam) are shown. Fringes appear superimposed on an image of the object. The fringes and mixing are thus in the image plane and can be recorded by a sensor array also in the image plane. In the right column of FIG. 3B, representations resulting from a Fourier transform of a recorded intensity-only detected sub-aperture image are shown for a rectangular aperture for idealized (upper panel) and actual (lower panel) cases. In the example, side lobes are shown to be on both sides of a main structure. Significance of these side lobes and how such side lobes can be used to obtain a high-resolution image are described herein in greater detail.

In FIG. 3C, the left-most panel depicts a Fourier space representation of the object corresponding to one of the side lobes for one of the sub-aperture image. The third panel depicts a collection of similar Fourier space representations for multiple sub-aperture images obtained at different spatial homodyne configurations. A transform operation (such as an inverse Fourier transform) performed on such a representation can yield the intensity image of the object, where the resulting image is shown to have a significant improvement in resolution when compared to the intensity image (second panel) corresponding to a single sub-aperture. Various examples of how such sub-aperture images can be processed so as to allow construction of high-resolution intensity are described herein in greater detail.

Figure 4A:
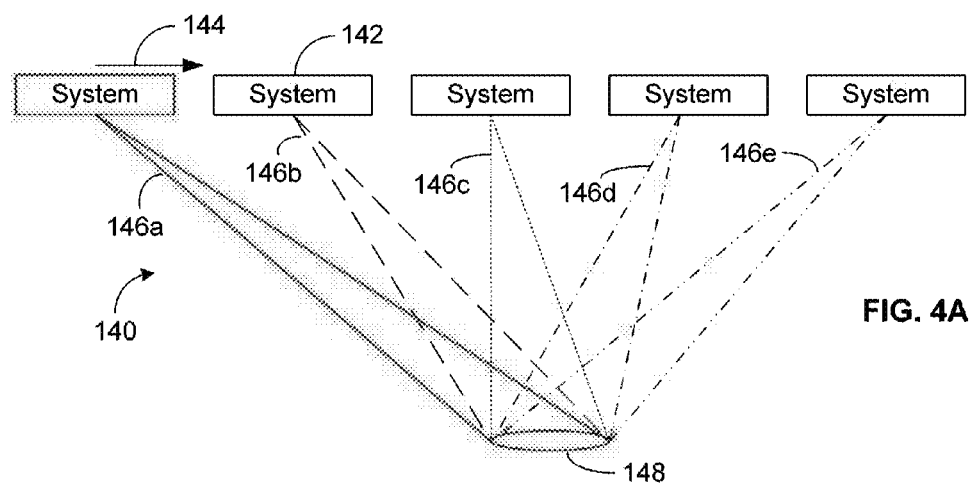
FIG. 4A shows that in certain implementations, a synthetic aperture functionality for an imaging system can be facilitated by the imaging system moving relative to an object to obtain a number of images that can be processed to yield a higher resolution image.

FIGS. 4A-4D show examples of imaging situations 140, 150, 350, 360, where sub-images can be obtained by changing the relative orientation between an object 148, 158, 358, 368 and an imaging system 142, 152, 352, 362. In FIG. 4A, the system 142 is depicted as moving (arrow 144) relative to the object 148 that is substantially stationary. Thus, sub-aperture complex images having different phase information associated with sub-aperture signals (depicted as 146a-146e) from the object 148 can be formed by the system 142 so as to allow formation of a higher resolution image.

Figure 4B:
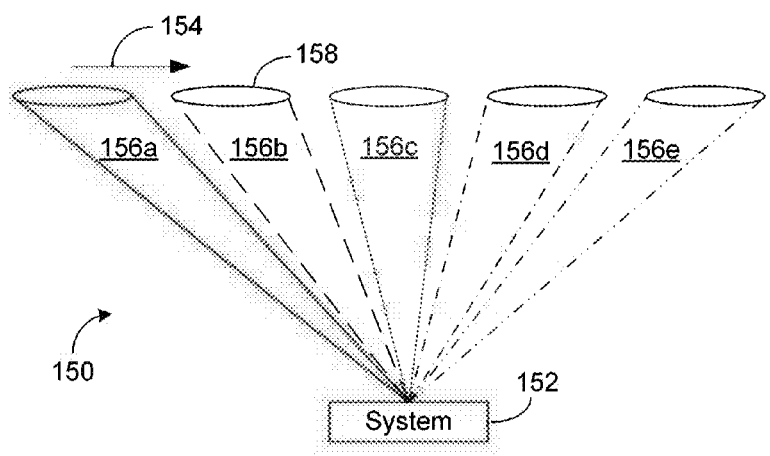
FIG. 4B shows that in certain implementations, a synthetic aperture functionality for an imaging system can be facilitated by the imaging system obtaining a number of images of an object that is moving relative to the imaging system, where the number of images can be processed to yield a higher resolution image.

In FIG. 4B, the system 152 is depicted as being substantially stationary and tracking the object 158 that is moving (arrow 154). Thus, sub-aperture complex images having different phase information associated with sub-aperture signals (depicted as 156a-156e) from the object 158 can be formed by the system so as to allow formation of a higher resolution image.

Figure 4C:
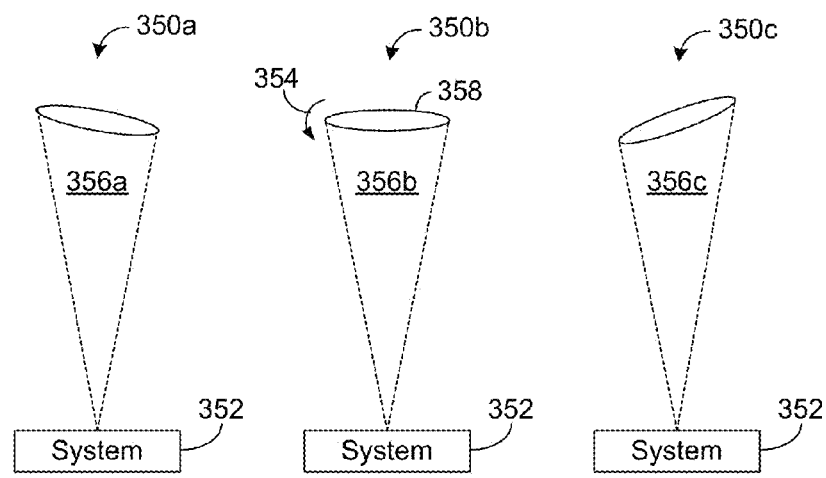
FIG. 4C shows that in certain implementations, a synthetic aperture functionality for an imaging system can be facilitated by the imaging system obtaining a number of images of an object that rotates relative to the imaging system, where the number of images can be processed to yield a higher resolution image. Such a configuration can be useful in testing the imaging capability in a laboratory environment where an object can be readily rotated using a rotation stage.

In FIG. 4C, the system 352 is depicted as being substantially stationary and obtaining images of the object 358 that is rotating (arrow 354). Thus, sub-aperture complex images having different phase information associated with sub-aperture signals (depicted as 356a-356c) from the object 358 can be formed by the system so as to allow formation of a higher resolution image. This configuration is useful to demonstrate the processes described herein as the object can be conveniently rotated in a laboratory environment using a translation stage.

Figure 4D:
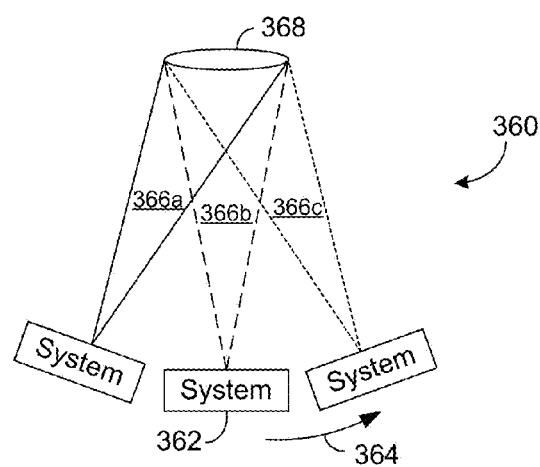
FIG. 4D shows that in certain implementations, a synthetic aperture functionality for an imaging system can be facilitated by the imaging system obtaining a number of images of an object at different angular orientations relative to an object, where the number of images can be processed to yield a higher resolution image.

In FIG. 4D, the system 362 is depicted as moving (arrow 364) relative to the object 368 that is substantially stationary so that the object 368 can be imaged from different angles. Thus, sub-aperture complex images having different phase information associated with sub-aperture signals (depicted as 366a-366c) from the object 368 can be formed by the system 362 so as to allow formation of a higher resolution image.

In certain implementations, combinations of the forgoing examples of relative motions between the object and the imaging system are also possible.

Figure 5A:
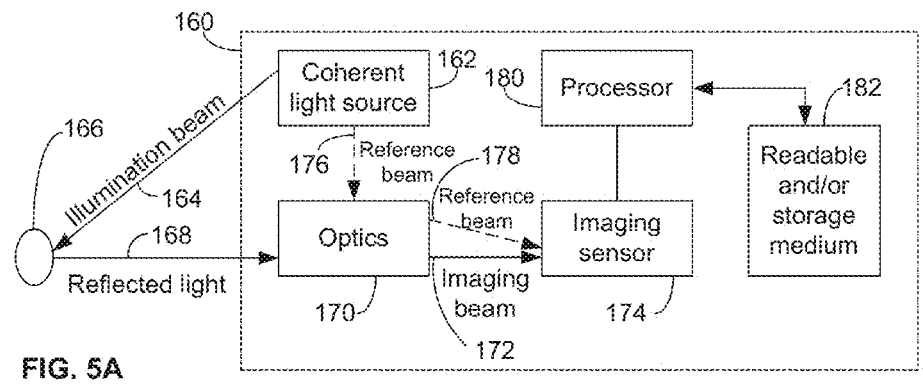
FIGS. 5A and 5B schematically depict examples of an imaging system configured to obtain spatially homodyned or heterodyned images so as to facilitate formation of a synthesized image having a higher resolution.
Figure 5B:
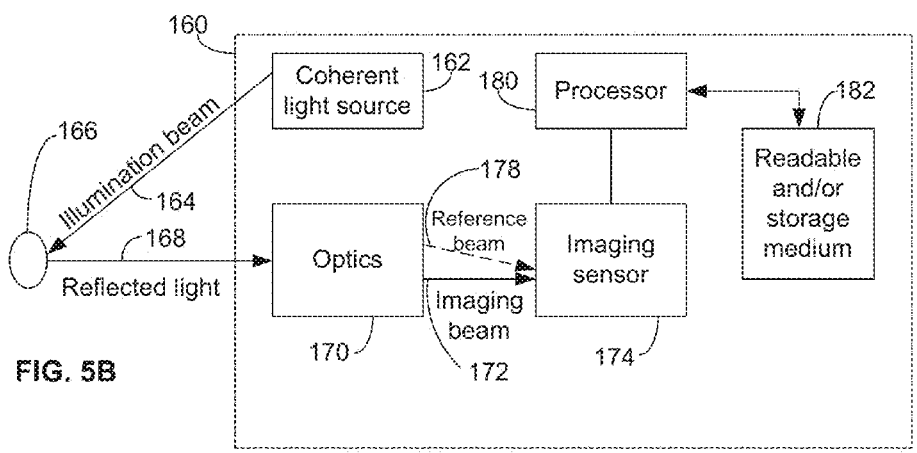

FIGS. 5A and 5B show that in certain implementations, an imaging system 160 can be configured to provide a coherent illumination beam 164 to an object 166 so as to yield reflected light 168 for forming an image. As shown, the reflected light 168 from the object 166 can be received by an optics component 170 so as to yield an imaging beam 172. The imaging beam 172 can be provided to an imaging sensor 174 (e.g., a pixelated sensor such as CCD, CMOS, etc.) so as to yield signals representative of an image of the object 166.

As shown in FIGS. 5A and 5B, the coherent illumination beam 164 can be provided by a coherent light source 162. FIG. 5A shows that in certain implementations, phase information for the image of the object 166 resulting from the illumination beam 164 can be obtained by use of a reference beam also provided by the coherent light source 162. A first reference beam 176 from the coherent light source 162 can be sent through at least a portion of the optics component 170 to yield a second reference beam 178. The second reference beam 178 can be combined with the imaging beam 172 such that signals representative of the image of the object 166 also include phase information.

FIG. 5B shows that in certain implementations, some or all of the optics component 170 may be used to condition the signal 168 to create both an imaging beam 172 and a reference beam 178. Such conditioning of the signal 168 can be achieved in a number of ways known in the art. In such an implementation, the reference beam 176 of FIG. 5A which comes internally from the coherent light source 162 is not required; and removal of such an internal reference beam can reduce the complexity of an imaging system.

In FIGS. 5A and 5B, the optics component 170 can be configured to establish the object 166 and sensor 174 at conjugate planes such that image of the object is formed at the sensor 174. The sensor 174 thereby records the image as well as the interference fringes created by mixing the image beam 172 and the reference beam 178 at the image plane.

In certain implementations, the imaging system 160 can include a processor 180 configured to control various functionalities of the system 160, including processing of complex image signals from the imaging sensor 174. Examples of processes and control features that can be facilitated by the processor 180 are described herein in greater detail.

In certain implementations, a processor as described herein can be configured to facilitate implementation of various processes described herein. For the purpose of description, embodiments of the present disclosure may also be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

In certain embodiments, these computer program instructions may also be stored in a computer-readable medium (e.g., 182 in FIG. 5) that can direct a computer or other programmable data processing apparatus to operate in a particular manner, such that the instructions stored in the computer-readable medium produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the acts specified in the flowchart and/or block diagram block or blocks.

In certain implementations, signals representative of complex images and processed by the processor 180 can be in digital format. In certain embodiments, such digital signals can be further processed by the processor 180 so as to yield a high-resolution combined image. In other embodiments, such digital signals can be stored in a storage medium 182 for further analysis at a later time. The storage medium 182 can be physically located locally with the processor 180 (e.g., within the same housing), or remotely and capable of communicating with the processor 180 (e.g., by wire or wirelessly).

Figure 6:
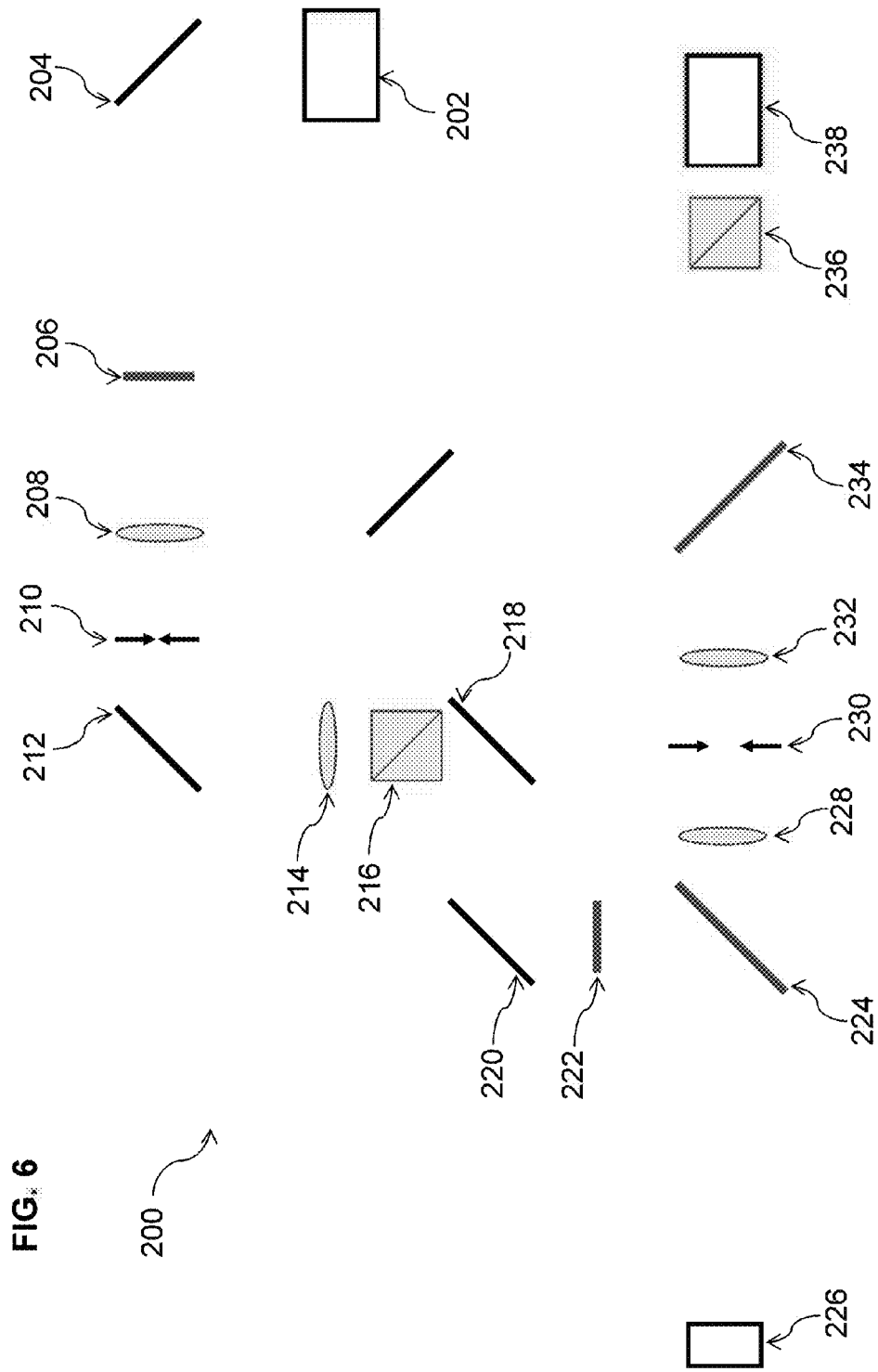
FIG. 6 shows an example configuration of the imaging system of FIG. 5A where, in this example, an object being imaged can be relatively close to an imaging sensor.

To demonstrate applicability of imaging methodologies as described herein, an example imaging configuration as shown in FIG. 6 was set up and operated as described in reference to FIG. 7. Other imaging configurations are also described herein. For example, FIGS. 8 and 10-12 are some possible alternate imaging configurations where one or more features of the present disclosure can be implemented.

FIG. 6 shows an example configuration 200 having a coherent light source 202, an assembly of optical elements, and an imaging sensor 238. A processor is not shown in the example of FIG. 6; however, it will be understood that signals from the imaging sensor 238 can be read out for processing in a number of ways.

The example shown in FIG. 6 is configured to allow illumination of an object 226 and obtaining an image of such an object, when the object 226 is relatively close to the imaging sensor (e.g., both on a laboratory table). Another example shown in FIG. 8 can be utilized to image an object that is relatively far away from an imaging sensor. More detailed descriptions relating to object-illumination, object-imaging, and homodyne beam generation are described in the context of the example configuration of FIG. 6. Similar techniques can be utilized for the example configuration of FIG. 8.

Figure 7A:
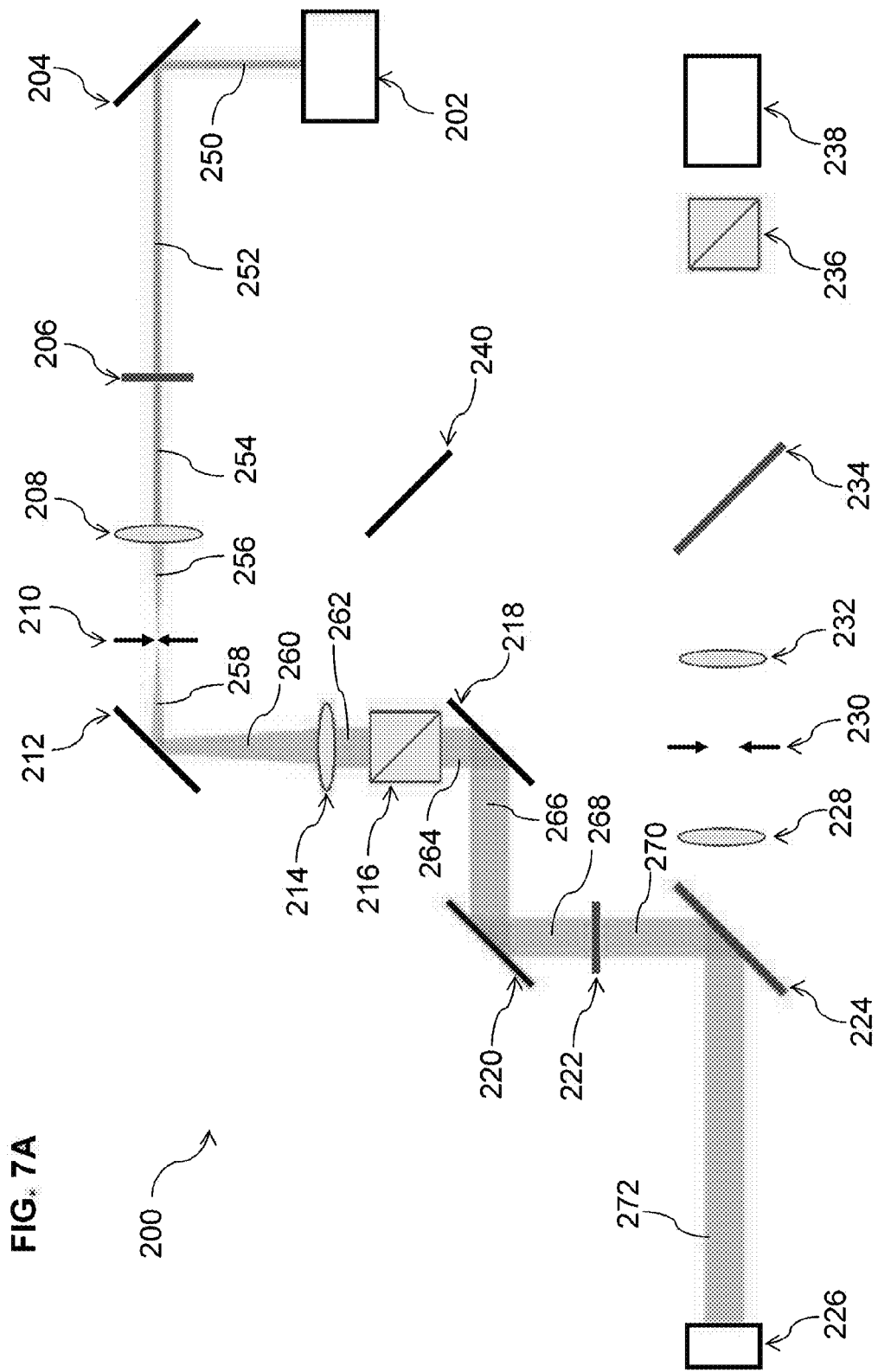
FIG. 7A shows an example of an illumination beam being provided by the imaging system of FIG. 6 to the object being imaged.
Figure 7B:
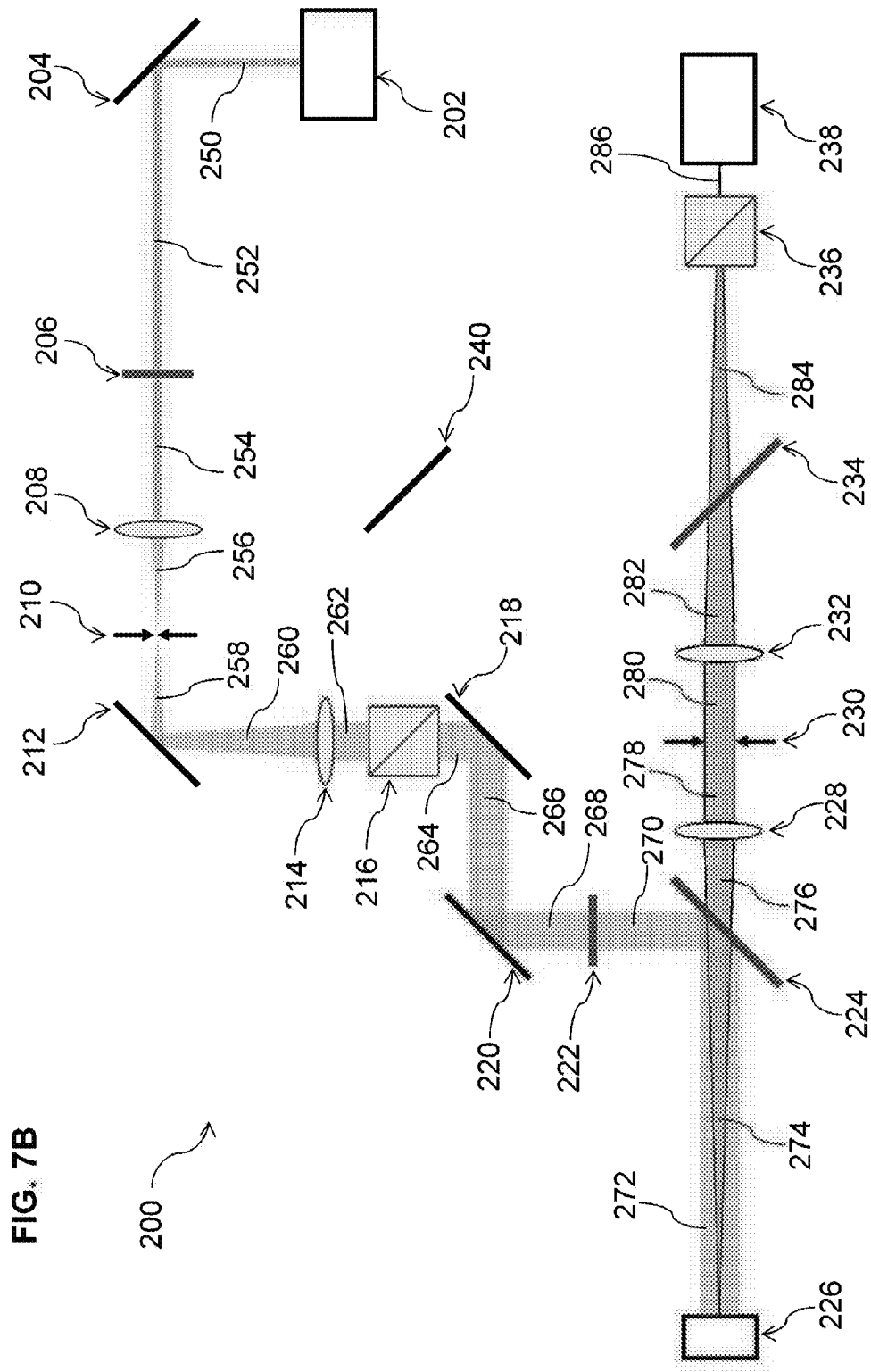
FIG. 7B shows an example of an image being formed by the illumination of the object and being detected by the imaging sensor of the example system of FIG. 6.
Figure 7C:
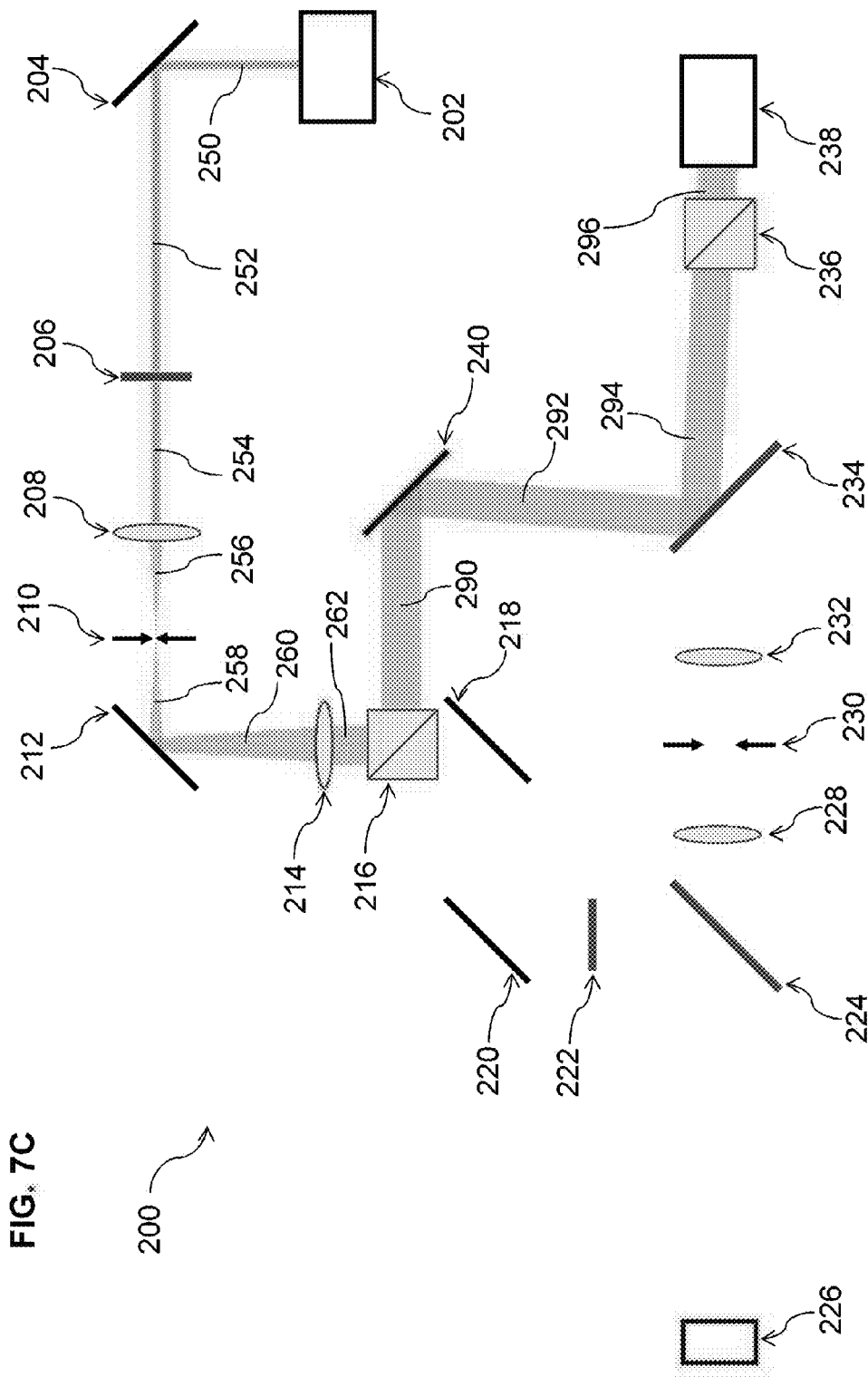
FIG. 7C shows an example of a homodyne beam being provided by the example system of FIG. 6.
Figure 7D:
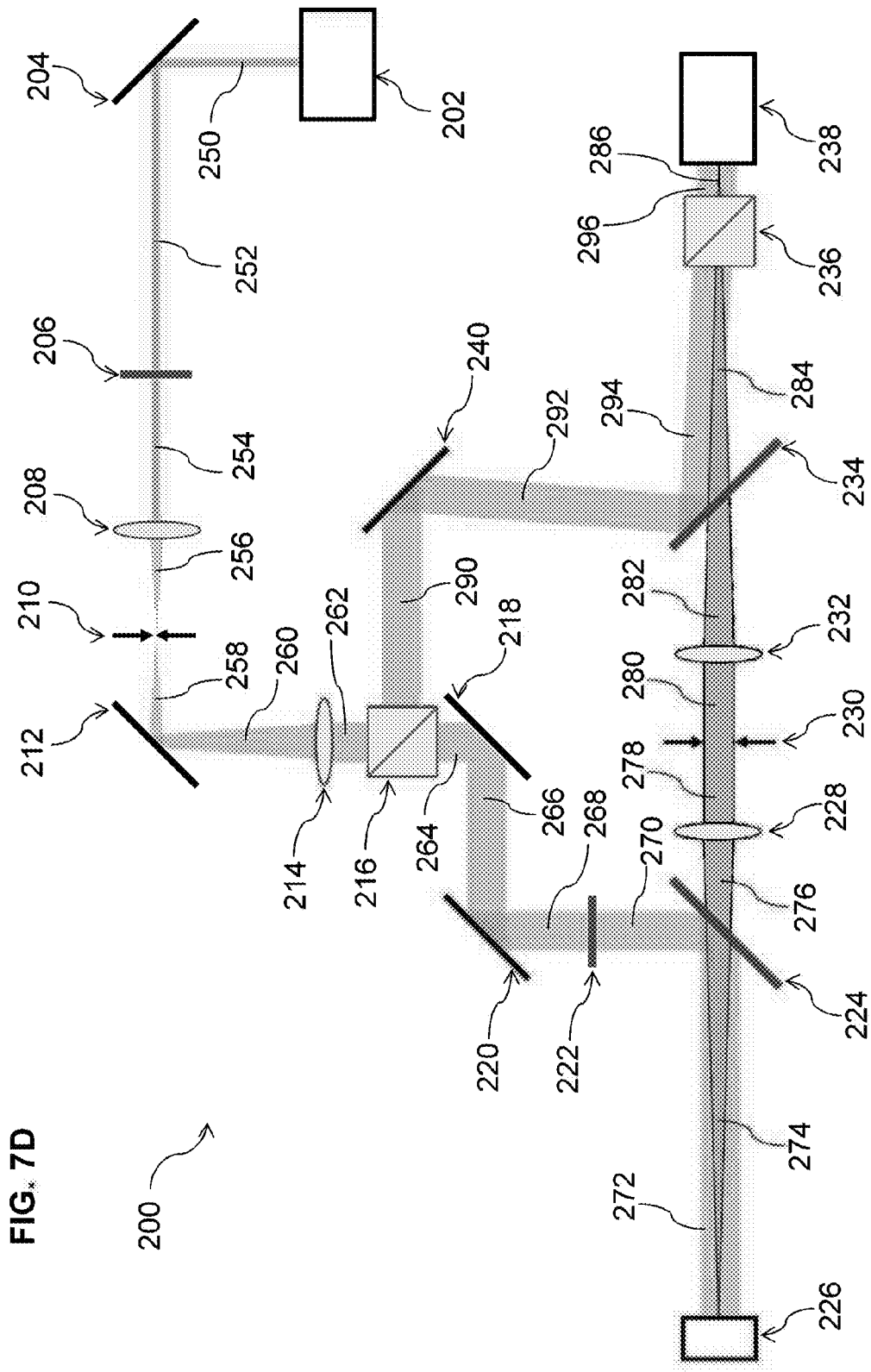
FIG. 7D shows a combination of the various beams of FIGS. 7A-7C that can be present during operation of the example system of FIG. 6.

Various operating features of the example configuration 200 of FIG. 6 are described in reference to FIGS. 7A-7D. FIG. 7A shows how an illumination beam can be delivered from the coherent light source 202 to the object 226. FIG. 7B shows how light from the object 226 can be collected and shaped to form an image at the imaging sensor 238. FIG. 7C shows how a homodyne reference beam can be delivered from the coherent light source 202 to the imaging sensor 238. FIG. 7D shows all of the foregoing operating features together.

FIGS. 6 and 7A show that in certain implementations, a coherent light source 202 (e.g., a laser) can be provided so as to output a coherent light beam 250. For the example configuration 200, the light beam 250 can be a polarized beam; however, such polarization is not a requirement.

The coherent light beam 250 is depicted as being redirected as a beam 252 by a turn mirror 204. The beam 252 is then passed through a half-wave plate 206, to retard one polarization component by half-wave, so as to yield a beam 254. In some situations, the half-wave plate 206 can facilitate sensed light having a desired polarization, and/or to provide relative intensity control for the different beams. Both of such functionalities can be achieved in a number of other ways. The beam 254 is depicted as passing through a spatial filter assembly (converging lens 208 and an aperture 210). The converging lens 208 and the aperture 210 can be selected and positioned so as to yield a spatially filtered diverging beam 258. The diverging beam 258 is depicted as being redirected and continuing to diverge as a beam 260 by a turn mirror 212. The diverging beam 260 is depicted as passing through a collimating lens 214 so as to yield a collimated beam 262 having a wider beam width than the beam (250) emerging from the source (202).

In certain implementations, a polarizing beam splitter 216 can be provided so as to split the broadened and collimated beam 262 into two beams based on polarization. The first of the two beams, having a first polarization, is depicted in FIG. 7A as continuing as a first polarized beam 264. The second of the two beams, having a second polarization, can be utilized as a reference homodyne beam described in reference to FIG. 7C. In certain implementations, the homodyne beam having the second polarization is the polarization component that is half-wave retarded by the half-wave plate 206.

Referring to FIG. 7A, the first polarized beam 264 is depicted as being turned by turn mirrors 218, 220 so as to yield beams 266, 268, respectively. The beam 268 is depicted as being passed through a half-wave plate 222 so as to yield a beam 270. The half-wave plate 222 can be configured and disposed to provide substantially the same half-wave retardation for the first polarized beam 270 so as to restore the original phase relationship (before the half-wave plate 206) with the second polarization component. The half-wave phase shifted beam 270 is depicted as being turned by a beam splitter 224 (e.g., 50/50 plate beam splitter) so as to yield a coherent illumination beam 272 to the object 226. In certain implementations, the width of the illumination beam 272, which in turn can determine a field of view of imaging, can be selected appropriately.

Referring to FIG. 7B, an example ray tracing resulting from reflection of the illumination beam 272 from a portion of the object 226 is depicted. A ray envelope 274 is depicted as diverging from the object 226 and passing through the beam splitter 224 so as to yield an envelope 276. The diverging ray envelope 276 is depicted as being provided to an assembly of imaging optics (e.g., imaging lenses 228, 232 and an aperture 230) so as to yield a converging ray envelope 282 being focused at an imaging plane of the imaging sensor 238. The example imaging lens 228 can be configured (e.g., a converging lens) so as to collimate the diverging envelope 276 into a collimated envelope 278. The collimated envelope 278 can be passed through the aperture 230 (e.g., a rectangular shaped aperture) so as to yield a defined collimated envelope 280. The defined and collimated envelope 280 can pass through the lens 232 (e.g., a converging lens) so as to yield the converging envelope 282.

The converging envelope 282 can pass through a beam splitter 234 (e.g., 50/50 plate beam splitter) so as to continue as a converging envelope 284. The ray envelope 284 from the object 226 is depicted as passing through a polarizing beam splitter 236 and continuing as a ray envelope 286 to the imaging sensor 238. In some embodiments, the beam splitter 234 can be used to combine the homodyne beam 292 (FIG. 7C) with the ray envelope 286 so as to allow mixing of the two at an imaging plane where the sensor 238 is located.

Referring to FIG. 7C, the polarizing beam splitter 216 is described herein as splitting the broadened and collimated beam 262 into two beams based on polarization. The first beam is described in reference to FIG. 7A as yielding the illumination beam 272 delivered to the object 226. The second beam, to be utilized as a reference homodyne beam, is depicted as emerging from the polarizing beam splitter 216 as a second polarized beam 290.

The second polarized beam 290 is depicted as being redirected by a tilt mirror 240 so as to yield a beam 292. In certain implementations, the tilt mirror 240 can be moved so as to provide spatial variations of the homodyne beam to, for example, allow obtaining of different sub-aperture complex images having different side lobe locations in Fourier space. Thus, in some imaging situations, the example imaging configuration 200 of FIGS. 6 and 7 can be implemented to yield internal spatial movements of the homodyne beam relative to the imaging ray envelope.

The re-directed homodyne beam 292 is depicted as being re-directed by the beam splitter 234 (e.g., 50/50 plate beam splitter) so as to yield a beam 294. In certain implementations, the beam splitter 234 and/or the tilt mirror 240 can be moved so as to provide spatial movements of the homodyne reference beam relative to the imaging ray envelope. The beam 294 is depicted as passing through the polarizing beam splitter 236 so as to be delivered to the imaging sensor 238 along with the ray envelope 286 (FIG. 7D).

FIG. 7D shows together the source beam, illumination beam, imaging ray envelope, and homodyne beam described in reference to FIGS. 7A-7C.

Figure 8:
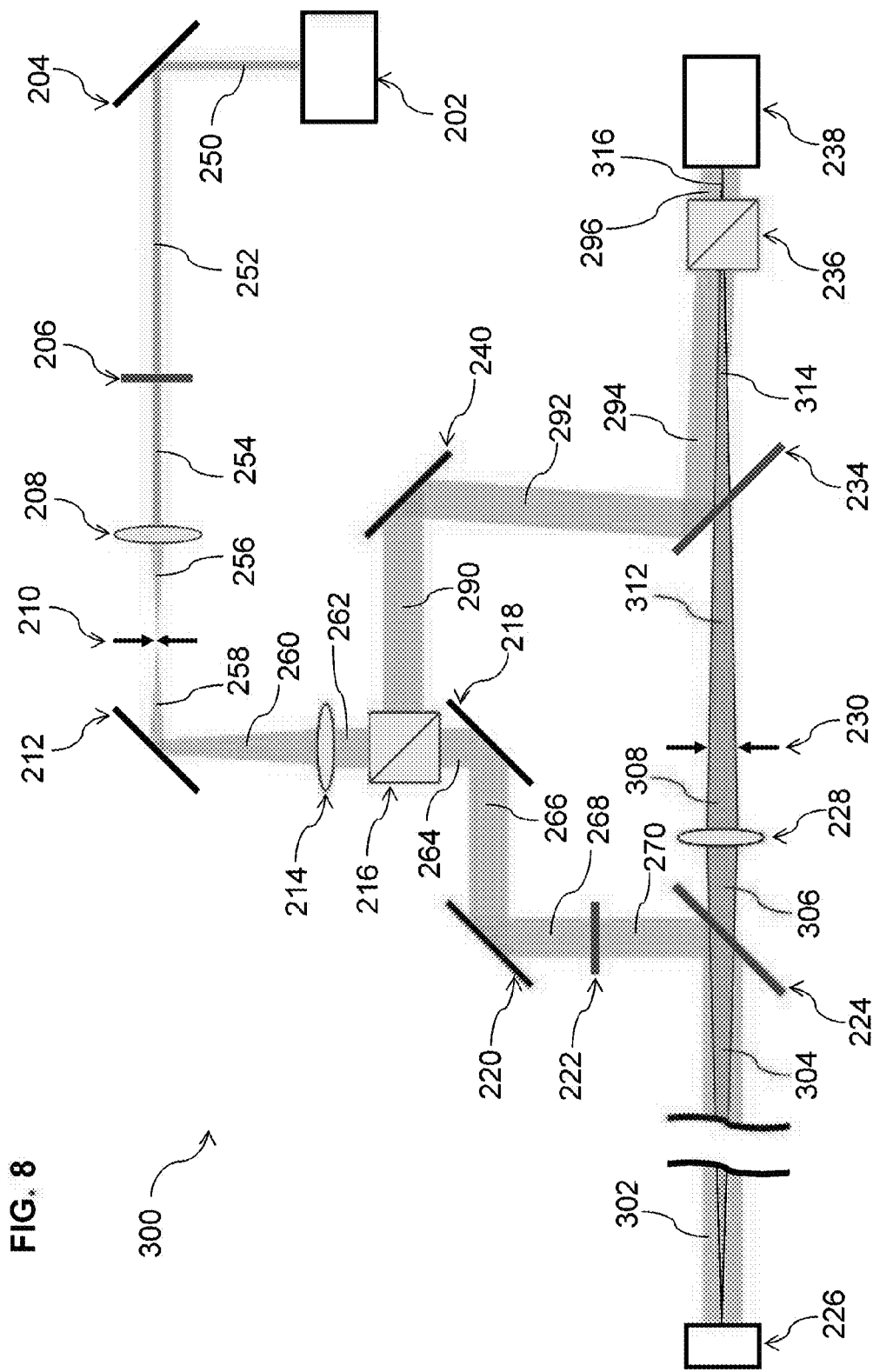
FIG. 8 shows an example configuration of the imaging system of FIG. 5 where, in this example, an object being imaged can be relatively far from an imaging sensor.

FIG. 8 shows another example imaging configuration 300 where the object 226 relatively far away from the imaging sensor 238. To accommodate such a configuration, an illumination beam 302 can be generated and delivered to the object 226 in a manner similar to that of the beam 272 of FIG. 7A. A ray envelope 304 resulting from the illumination of the object 226 can be shaped and delivered to the imaging sensor in a manner similar to that described in reference to FIG. 7B; except in this example configuration (300), the converging lens 232 can be omitted. Thus, the beam splitter 224 yields an envelope 306; imaging lens 228 yields an envelope 308 that is formed into an envelope 312 by the aperture 230 (e.g., a rectangular shaped aperture); the beam splitter 234 (e.g., 50/50 plate beam splitter) yields an envelope 314; and the polarizing beam splitter 236 yields an envelope 316 that is delivered to the imaging sensor 238. The object 226 and the image sensor 238 are at conjugate planes such that an image of the object is formed at the imaging sensor together with the interference fringes.

In the examples described in reference to FIGS. 7 and 8, a change in the angle between the reference beam (294) and the imaging ray envelope (284 in FIG. 7, 314 in FIG. 8) can result in a change in the location of the side lobes relative to the central peak in Fourier space, but not necessarily in the content of the side lobes. If the change in the angle between the reference beam and the imaging ray envelope is the only change in two imaging configurations, the two different configurations do not sample different spatial frequencies associated with the object, even though the side lobe displacements (relative to the central peak in Fourier space) are different.

Figure 9A:
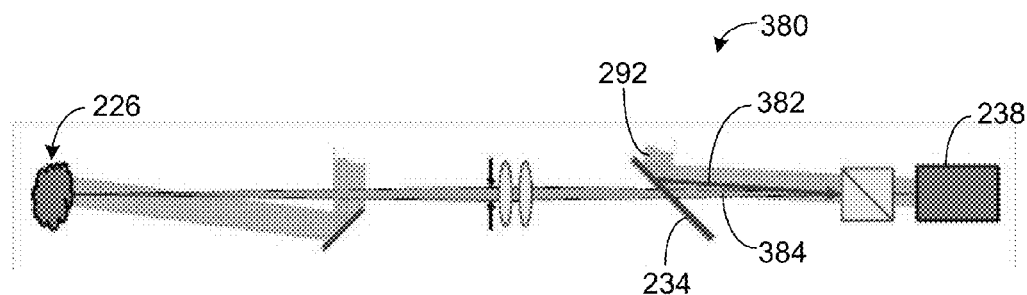
FIGS. 9A-9D show that in some situations, a change in orientation of an imaging beam and a reference beam can yield a shift in side lobes in Fourier space without change in spatial frequency content of the side lobes, if such a change is not accompanied with a change in orientation between an object and an imaging system.
Figure 9B:
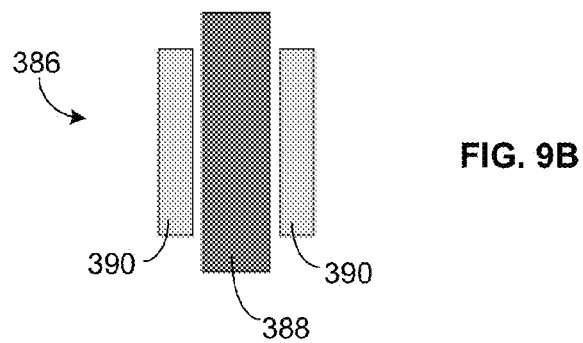

FIGS. 9A-9D show examples of such two imaging configurations where the only change is in the angle between the reference beam and the imaging ray envelope. In an imaging configuration 380, an imaging ray envelope 384 is depicted as being collected from an object 226 and focused on an imaging device 238. In FIG. 9A, a reference beam 292 is depicted as being reflected from a beam splitter 234 so as to yield a beam 384 that mixes with the imaging ray envelope 384 at the imaging plane where the imaging device 238 is located. For such a configuration, an example side lobe configuration 386 in Fourier space is depicted in FIG. 9B, where side lobes 390 are positioned relative to a central peak 388 in Fourier space.

Figure 9C:
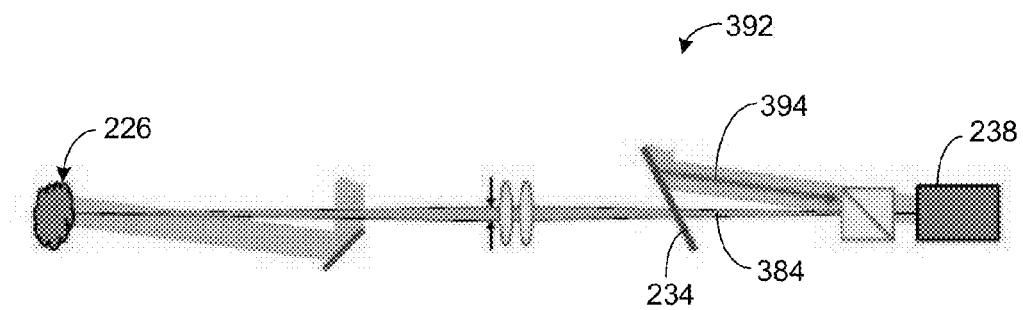
Figure 9D:
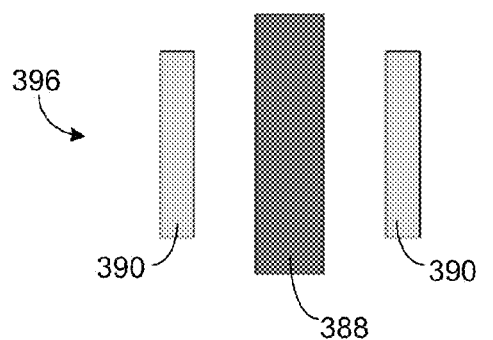

In FIG. 9C, a reference beam 292 is depicted as being reflected from the beam splitter 234 that has a different orientation so as to yield a beam 394 having a different angle relative to the imaging ray envelope 384. The reference beam 394 and the imaging ray envelope 384 are shown to mix at the imaging plane of the imaging device 238. For such a configuration, an example side lobe configuration 396 in Fourier space is depicted in FIG. 9D, where the side lobes 390 are positioned at different locations (from the example of FIG. 9B) relative to the central peak 388 in Fourier space.

In certain implementations, however, the spatial frequency content of a side lobe can be changed by a change in relative orientation between an object and an imaging system. Such a change can be effectuated in the example configurations of FIGS. 7 and 8 by, for example, moving the aperture of the imaging system with respect to the object. In one implementation, for example, aperture 230 can be moved laterally relative to an imaging axis defined by the imaging ray envelope (278 in FIG. 7, 308 in FIG. 8). Such lateral movement of the aperture 230 facilitated the generation of the example high-resolution synthesized image shown in FIG. 3C.

Figure 10:
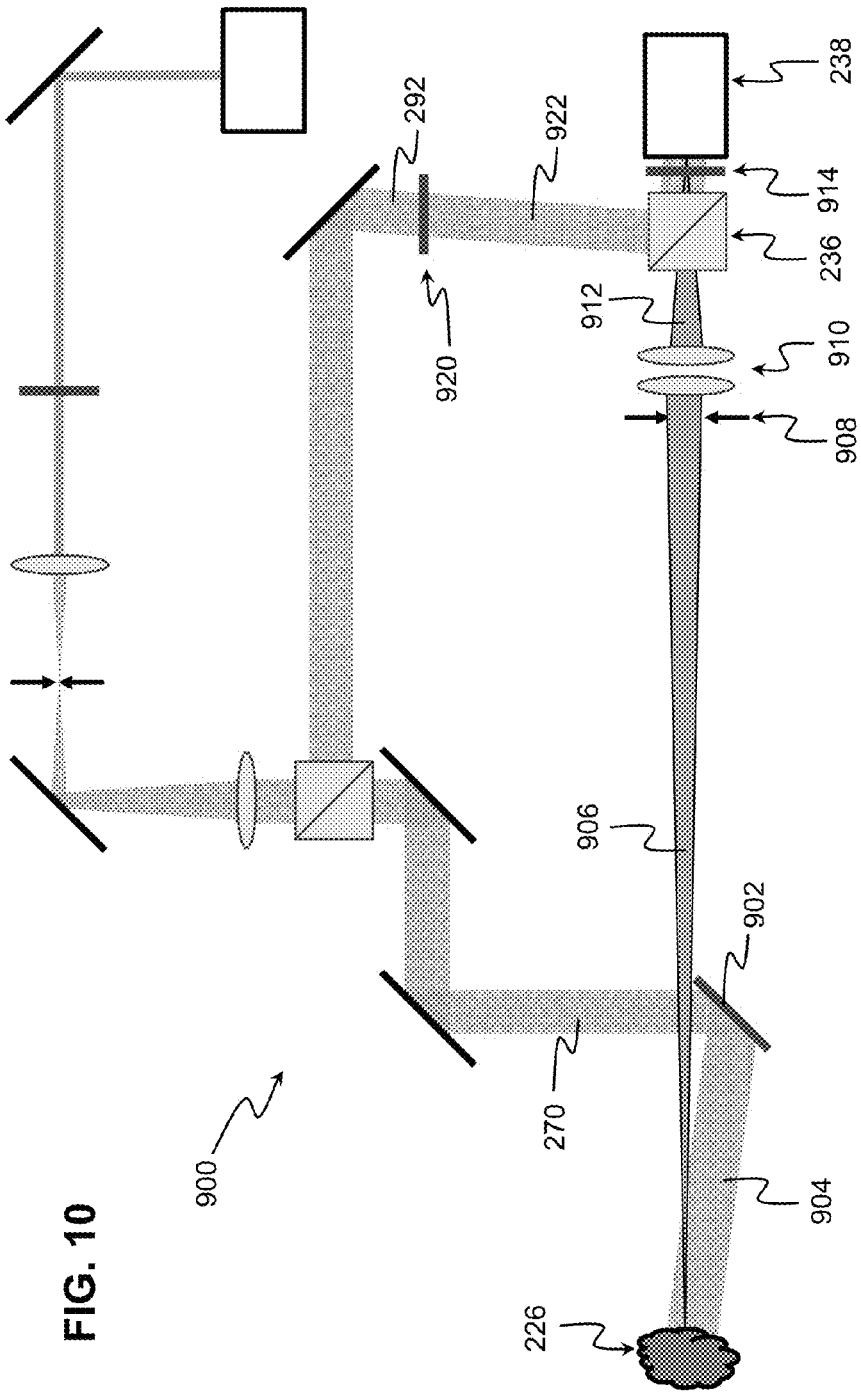
FIG. 10 shows an example imaging configuration where a change in orientation between an object and an imaging system can be introduced in one or more ways.

FIG. 10 shows another example imaging configuration 900 where a change in relative orientation between an object 226 and an imaging system can also be implemented. For the purpose of description, various components that yield an illumination beam 270 and a reference beam 292 can be similar to those described in reference to FIGS. 7 and 8.

In the example configuration 900 of FIG. 10, the illumination beam 270 can be re-directed by a mirror 902 so as to yield an illumination beam 904 delivered to the object 226. In some embodiments, such a mirror 902 can be more radiometrically efficient than the beam splitter of FIGS. 7 and 8.

Interaction of the illumination beam 904 with the object 226 is shown to yield a ray envelope 906 that is passed through an aperture 908 and optics 910 so as to yield an imaging ray envelope 912. In some embodiments, the aperture 908 can be a rectangular aperture, and the optics 910 can be configured to provide a desired field of view.

FIG. 10 further shows that in some embodiments, the reference beam 292 can be passed through a half-wave plate 920 to retard one polarization component by half-wave, so as to yield a beam 922. Such a half-wave plate at the shown position can facilitate tuning the relative intensity of the reference beam 292 compared to the imaging ray envelop 912 at the sensor 238.

The reference beam 922 is shown to be directed to an imaging device 238 via a 50/50 beam splitter 236 so as to be mixed with the imaging ray envelope 912 at an imaging plane associated with the imaging device 238. In the example shown, a linear polarizer 914 can be positioned between the beam splitter 236 and the imaging device 238 so as to facilitate both of the reference beam and the imaging ray envelope having substantially the same polarization at the imaging plane. Such a linear polarizer can be advantageous in some situations, since it can take up less space than, for example, a polarizing beam-splitting cube.

Figure 11:
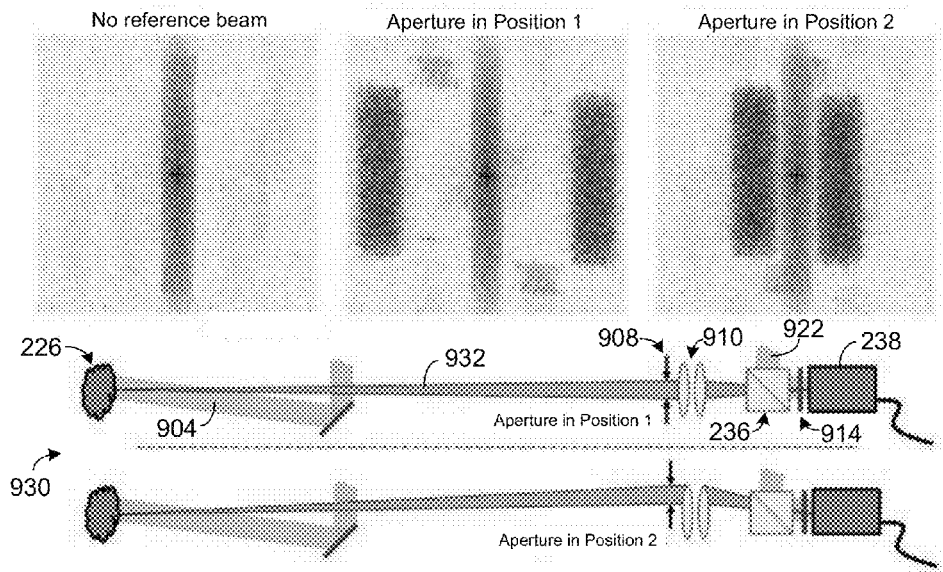
FIG. 11 shows an example configuration of the imaging system of FIG. 10 where a plurality of different spatially homodyned images can be obtained by lateral movement of an aperture along the imaging beam.
Figure 12:
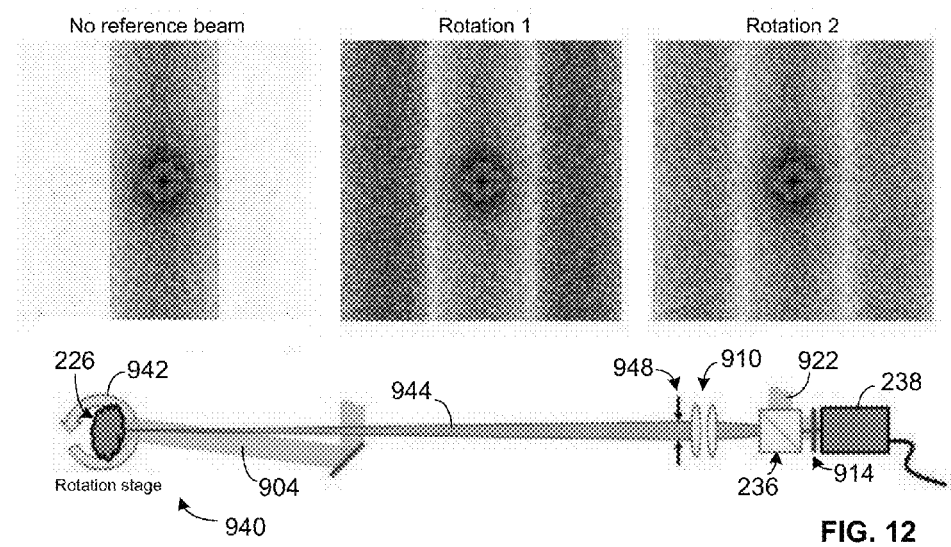
FIG. 12 shows an example configuration of the imaging system of FIG. 5A where a plurality of different spatially homodyned images can be obtained by relative rotational movement between the imagining system and the object.

In the example configuration of FIG. 10, a change in spatial frequency content of a Fourier-space side lobe can be introduced by a change in tilt between the imaging ray envelope 906 and a given portion of the object 226. Such a change in tilt can be effectuated in a number of ways, including those described in reference to FIG. 4. In some implementations an example configuration shown in FIG. 11 can be a laboratory analogue of the example imaging configuration of FIG. 4A; and an example configuration shown in FIG. 12 can be a laboratory analogue of the example imaging configuration of FIG. 4C. In the example of FIG. 11, such a tilt relative to the object can be provided by lateral motion of an aperture. Such a tilt configuration was utilized in the example configuration of FIGS. 6 and 7 to yield the example images of FIG. 3C. In the example of FIG. 12, such a tilt relative to the object can be provided by a rotation of the object itself. See also FIG. 4C. Additional details for each of the two examples are described herein in greater detail.

FIG. 11 shows that in certain implementations, a configuration 930 can be provided so that a tilt between an image-forming ray envelope 932 and the object 226 can be achieved by moving an aperture 908 laterally (with respect to the ray envelope 932, and up and down in the plane of illustration). In the example shown, orientation of a reference beam 922 can remain unchanged with respect to the object 226. In such a configuration, a change in the orientation of the ray envelope 932 relative to the object 226 can occur due to the lateral movement of the aperture 908, which in turn can facilitate obtaining of images having different spatial frequency contents within a limited range of spatial frequency. By way of an example, different locations (e.g., different distances from imaging axis) in a pupil plane can correspond to different spatial frequencies. Examples of such spatial frequency selection and resulting high resolution processed images are described herein in greater detail.

In FIG. 11, the image-forming ray envelope 932 can result from reflection of an illumination beam 904 from an object 226 in a manner similar to those described in reference to FIG. 10. FIG. 11 further shows that the image-forming ray envelope 932 that passes through the aperture 908 can be focused via optics 910, passed through a 50/50 beam splitter 236 and a linear polarizer 914, and delivered to an imaging plane of an imaging device 238. The reference beam 922 is depicted as being combined with the focused image-forming ray envelope by the beam splitter 236 and also passed through the linear polarizer 914, so as to be delivered to the imaging plane and mixed with the focused image-forming ray envelope at the imaging plane.

An image obtained from the imaging device 238 can be Fourier transformed as described herein so as to yield side lobes on both sides of a central peak in Fourier space. In FIG. 11, the lateral movement of the aperture 908 between two example positions (Position 1 approximately at the imaging axis of the optics 910, and Position 2 approximately at the edge of the optics 910) results in the side lobes being displaced at different distances relative to the central peak in Fourier space. Accordingly, appropriate movements of the aperture 908 can yield a series of overlapping side lobes that can be processed as describe herein to yield a high-resolution synthesized image.

In FIG. 11, the side lobe positions (relative to the central peak in Fourier space) corresponding to Position 1 and Position 2 of the aperture 908 can define a range in which the homodyne beam can be adjusted, which corresponds to the frequencies of the object that are attainable using this configuration. The example configuration of FIG. 11 can be implemented to demonstrate some of the imaging features expected from an imaging situation depicted in FIG. 4A. However, in some implementations, it can be seen that because of the finite size of the optics 910, the range of lateral motion of the aperture 908 can be limited. Accordingly, the obtainable range of the object's spatial frequencies can also be limited in some cases.

FIG. 12 shows that in certain implementations, a configuration 940 can be provided so that information for different frequencies are not obtained by a tilt between an image-forming ray envelope 944 and a reference beam 922, but by images obtained at different rotation-orientations (relative to an imaging device 238) of a rotatable object 226. In some embodiments, such a rotation can be facilitated by, for example, a rotatable stage 942. The image-forming ray envelope 944 can result from reflection of an illumination beam 904 from an object 226 in a manner similar to those described in reference to FIG. 10. FIG. 12 further shows that the image-forming ray envelope 944 that passes through the aperture 948 can be focused (via optics 910) to an imaging plane of the imaging device 238 so as to be mixed with the reference beam 922 (via a 50/50 beam splitter 236) at the image sensor 238.

In the example shown in FIG. 12, side lobes can be made to take up substantially all of the available Fourier space not occupied by the central lobe. Furthermore, the side lobes generally do not shift when the object is rotated. However, the side lobes correspond to different spatial frequencies for different amounts of rotation of the object. Accordingly, such a configuration can increase range of spatial frequency information that may be obtained. Similarly, as the pupil plane is associated with spatial frequency and frequency space, the number of sub-aperture images with corresponding to different spatial frequencies that may be combined and synthesized may also be increased when compared to, for example, the example of FIG. 11. In some situations, the forgoing increase in the number of sub-aperture images can yield a substantial removal of the limit in the number of sub-aperture images that may be synthesized. Examples of how such a rotational configuration can be utilized to introduce shift in the frequency content of the side lobes (in Fourier space) and thereby facilitate obtaining of high-resolution image are described herein in greater detail.

Figure 13:
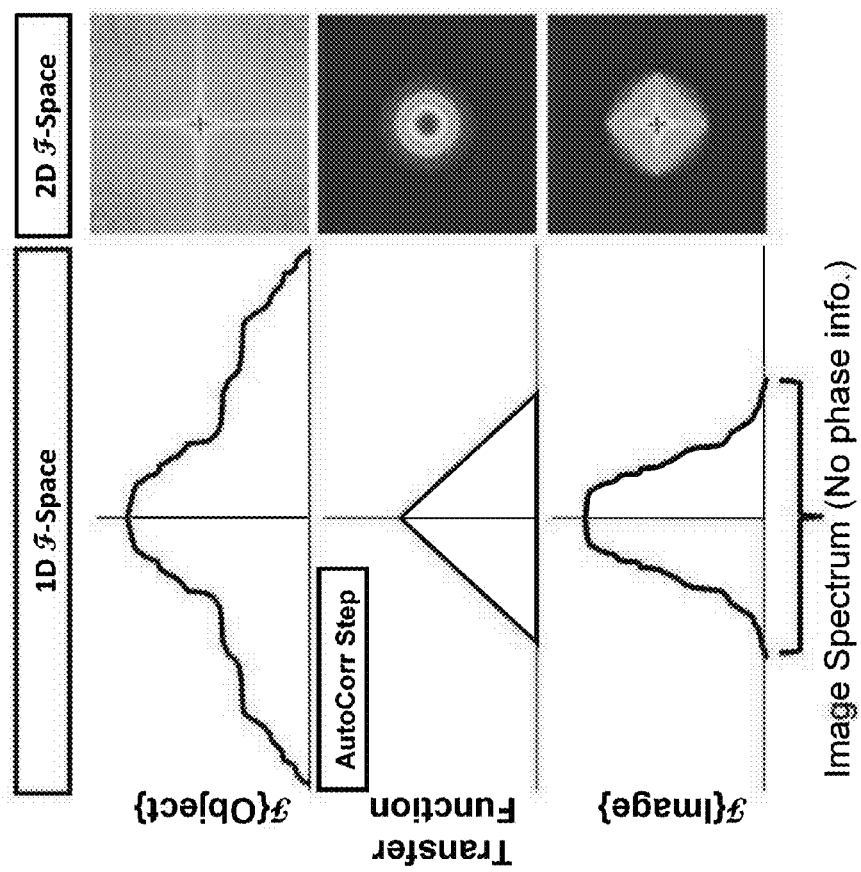
FIG. 13 depicts one-dimensional and two-dimensional Fourier representations of an example object and image resulting therefrom and having no phase information, where the image can be obtained by incoherent imaging, without homodyne.
Figure 14:
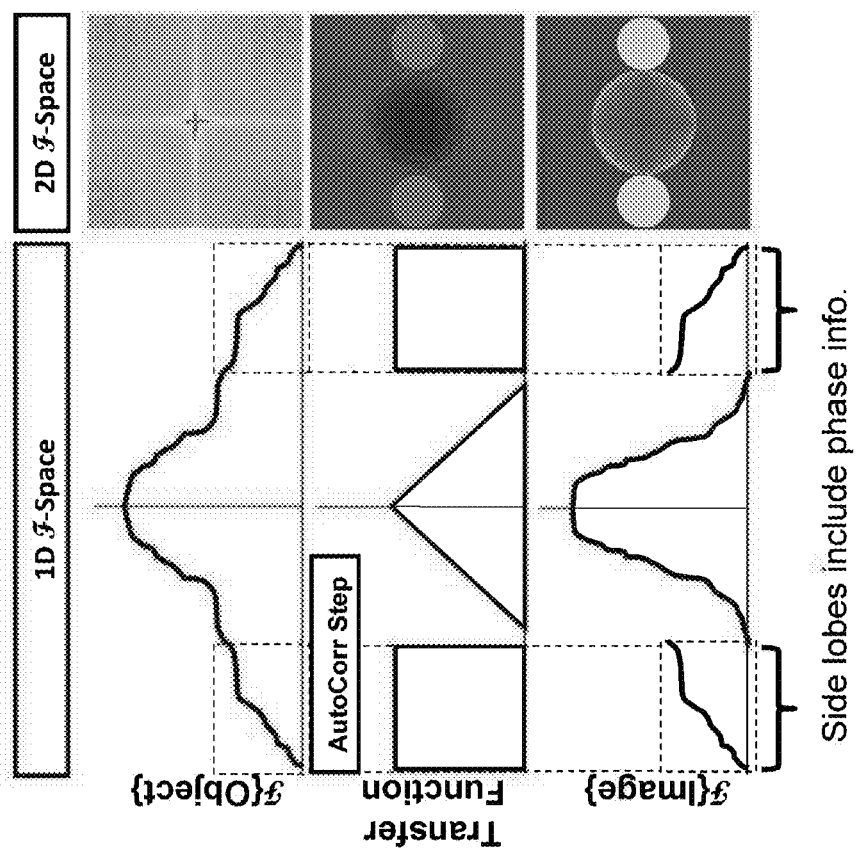
FIG. 14 depicts one-dimensional and two-dimensional Fourier representations of the example object and image resulting therefrom and having phase information, where the image can be obtained by incoherent imaging, with homodyne.

FIG. 15 shows an example of how the coherent imaging with homodyne feature (e.g., configurations 200, 300, 930 and 940 in FIGS. 7-12) can yield a desired sub-aperture complex image. To provide a context for obtaining of such a complex image, FIGS. 13 and 14 show images obtained by incoherent imaging without and with phase information. FIG. 13 depicts one-dimensional (left column) and two-dimensional (right column) of Fourier representations at different stages of an incoherent imaging process without a phase reference (e.g., homodyne beam). Accordingly, an image obtained from such an imaging process does not have phase information.

The top row in FIG. 13 shows one and two dimensional Fourier transformation of an object. In linear systems, Fourier transform of the object can be modeled to be at the pupil plane of an imaging system. The middle row of FIG. 13 represents a transfer function of the system. The Fourier transform of the image is shown in the bottom row and, in the example shown, is equal to the Fourier transform of the object (top row) multiplied by the transfer function (middle row). This is a Fourier representation of an intensity-only image obtained by the imaging sensor. Such an image does not contain phase information.

The middle row in FIG. 13 shows an example of what a circular shaped aperture would look like after being transformed by a common autocorrelation function. For the purpose of description, a one-dimensional Fourier representation of the aperture can be expressed as $F(v)$, with an understanding that similar expression and treatments described herein can be applied to a two-dimensional case.

An introduction of a feature such as a $\delta$-function sufficiently spaced from the main aperture in the v-space (e.g., frequency space) and autocorrelation transformation of the aperture with the $\delta$-function included results in formation of side lobes in the transformed representation. In certain implementations, such a $\delta$-function (or approximation of a $\delta$-function) in image space can be provided by a coherent homodyne beam (e.g., a plane wave arriving at an angle with respect to imaging axis).

In the example of FIG. 13, there is no homodyne beam; thus, there is no $\delta$-function introduced to the aperture. Accordingly, the autocorrelation transformation of the aperture (middle row) does not yield any side lobes.

In the example of FIG. 14, a homodyne beam is present; thus, there is a $\delta$-function introduced to the aperture, and as such, the transfer function displays side lobes (middle row). A linear system treatment of an intensity-only image (having the homodyne beam incorporated therein) yields the main feature in its Fourier representation (similar to the bottom row of FIG. 14) plus the side lobes on both sides of the main feature.

In the example of FIG. 14, an image of the object can be obtained by incoherent recording (e.g., with a CCD, CMOS or film). Thus, each side lobe (in a dashed box) obtained from the Fourier transformation of the collected image contains information, including aperture phase, about a higher range of the object's spatial frequencies. However, the side lobe does not include phase information about the object's lower spatial frequencies.

In certain implementations, such information about the central portion of the object's image can be obtained by imaging the object by coherent light. FIG. 15 shows an imaging situation similar to that of FIG. 14, except that the object is imaged by coherent light. For example, an imaging system described in reference to FIGS. 7-12 can be operated so as to image an object by coherent light.

In the example shown in FIG. 15, a side lobe (bottom row) can include phase information about the object's lower spatial frequencies. Alternative methods of utilizing information contained in such side lobes can include those found in Applicant's paper titled "Optical spatial heterodyne interferometric Fourier transform technique (OSHIFT) and a resulting interferometer," James A. Georges III, Proceedings of SPIE, Vol. 6711, Sep. 27, 2007, which is hereby incorporated herein by reference in its entirety. For the purpose of description herein, either or both of homodyne and heterodyne beams or functionalities are sometimes referred to as phase reference beams or functionalities.

In the example shown in FIG. 15, the side lobe is depicted as providing information (including phase) about the object's lower spatial frequencies (central portion in the upper left example depiction). In certain implementations, the spatial orientation between the object and the imaging system, and/or the spatial orientation of the reference homodyne beam, can be adjusted so as to obtain information (including phase) about the object's higher spatial frequencies. In certain implementations of the present disclosure, such information for different spatial frequencies of the object can be obtained and combined to yield an image having an improved resolution.

In the context of the example imaging configurations of FIGS. 7 and 11, and the example results of FIGS. 3B and 3C, the spatial orientation between the object and the imaging system can be adjusted by a laterally moving aperture. If the image-forming ray envelope 286 defines a first axis when at the center of the optics, the lateral motion of the aperture can yield a second axis of the image-forming ray envelope that forms an angle with respect to the first axis. In certain implementations, such an angle can be represented as being greater than or equal to approximately 1.5/(f#) (in radians), where the quantity (f#) is the f-number of the aperture. Additional information concerning such an angle calculation can be found in the previously referenced paper titled "Optical spatial heterodyne interferometric Fourier transform technique (OSHIFT) and a resulting interferometer."

As described in reference to FIG. 11, the tilt between the image-forming ray envelope 932 and the object can be formed by moving the aperture 908 laterally (with respect to the ray envelope 932, and up and down in the plane illustration). Such an adjustment in the tilt of the image-forming ray envelope 932 can also serve to select different spatial frequency ranges due to the object. Such spatial frequency selection and tilting of the axis of the image-forming ray envelope 932 can be considered to be similar to the example imaging configuration of FIG. 4A.

As described in reference to FIG. 12, the tilt between the image-forming ray envelope 944 and the object can be formed by rotating the object 226. Such an adjustment in the tilt of the image-forming ray envelope 944 can also serve to select different spatial frequency ranges associated with the object. Such spatial frequency selection can be considered to be similar to the example imaging configurations of FIGS. 4C and 4D, and related to the example imaging configurations of FIGS. 4A and 4B.

Figure 16B:
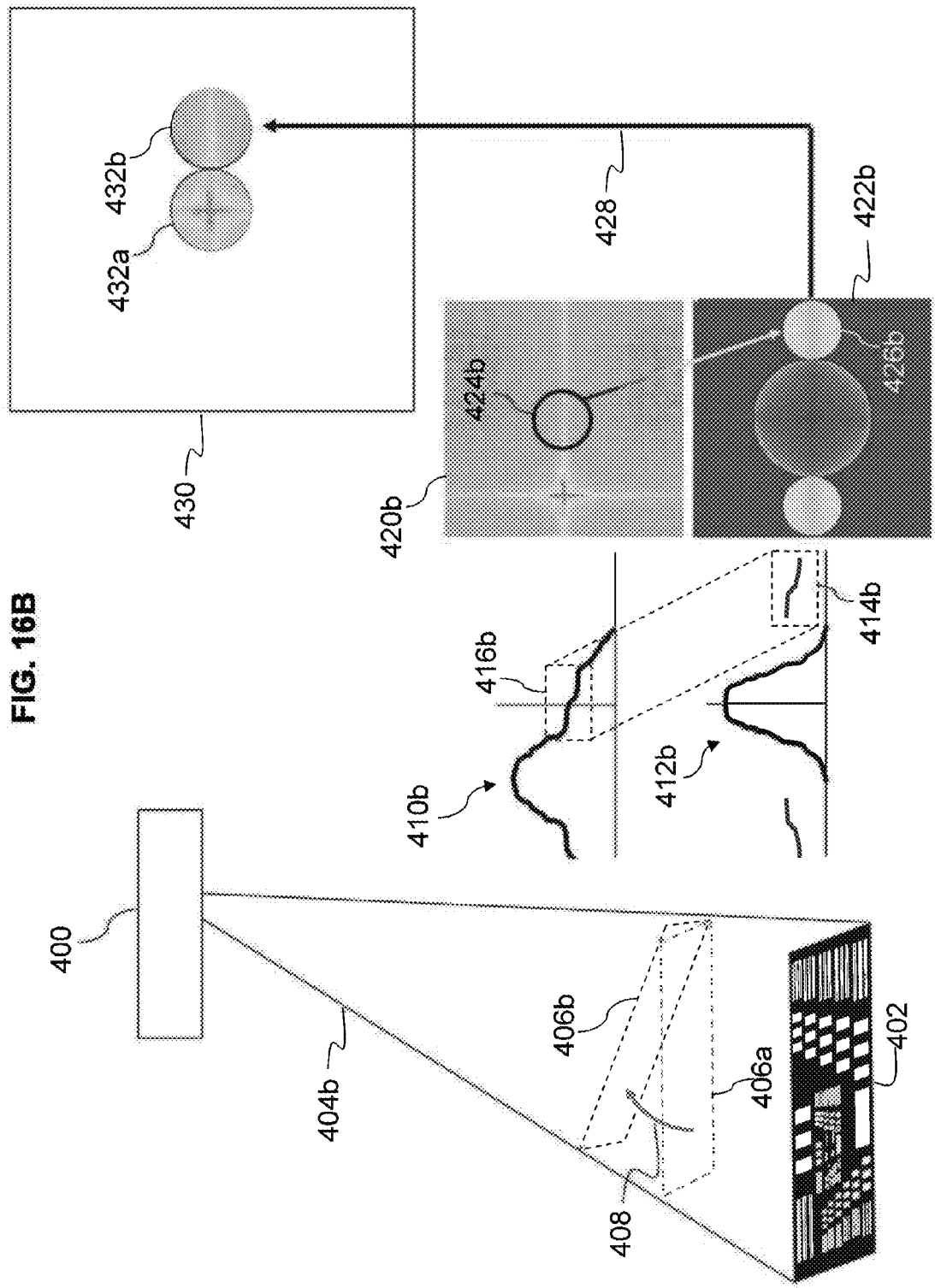
FIG. 16B shows an example of how a second portion of information from the complex image of FIG. 16A can be constructed by extracting a side lobe of a coherent Fourier space image obtained at a second spatial homodyne orientation.
Figure 16C:
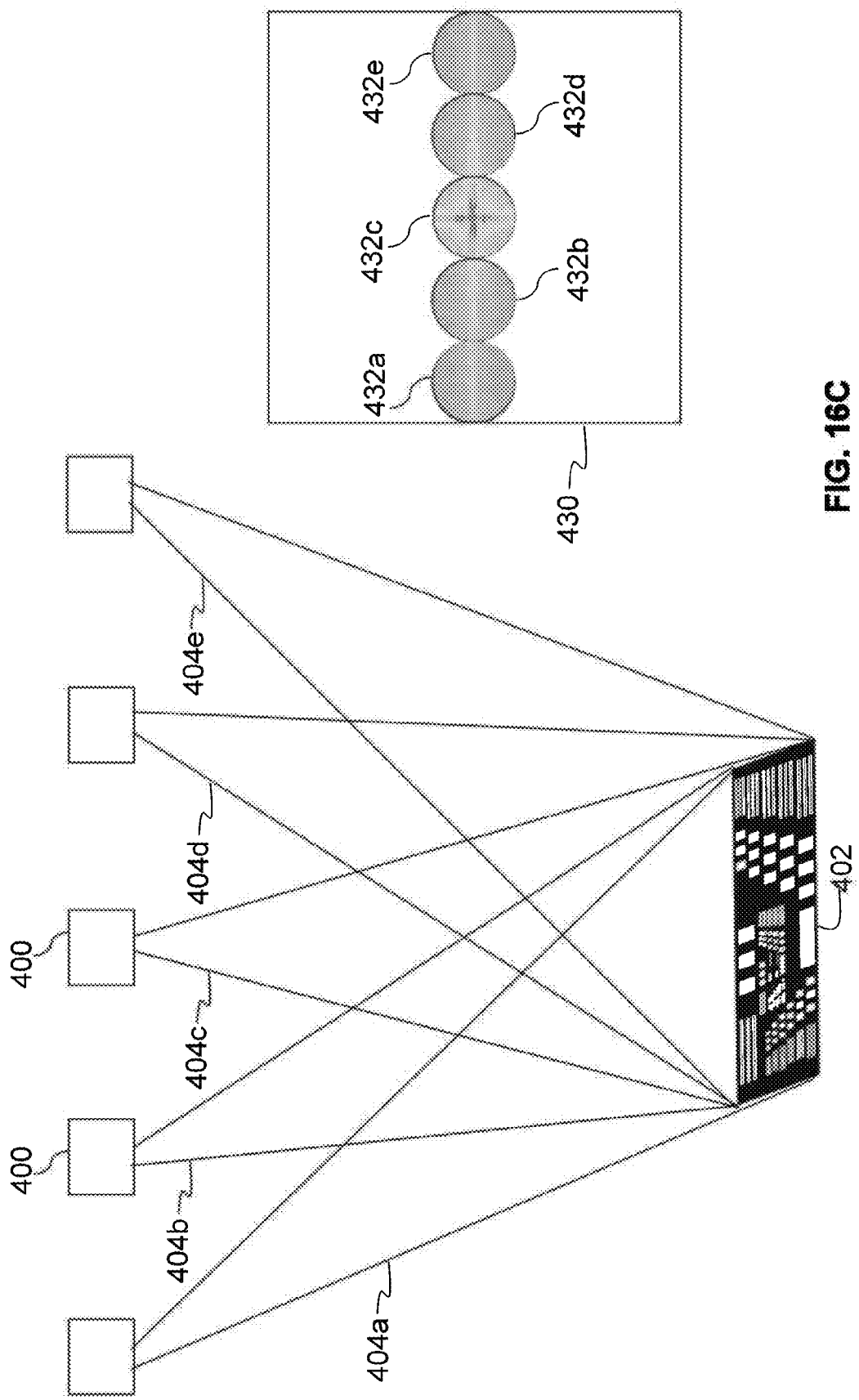
FIG. 16C shows how additional side lobes of coherent Fourier space images can be obtained at additional spatial homodyne orientations to further construct the complex image of FIG. 16B.

As described herein, different sub-aperture images can be obtained by providing motion between an object and an imaging sensor. An example sequence of how phase information can be obtained for different portions of an object's image is shown in FIGS. 16A-16C. Also shown in FIGS. 16A-16C is an example of how information contained in side lobes can be processed so as to allow formation of a combined image.

FIG. 16A depicts an imaging situation where an imaging system 400 can move relative to an object 402. In certain implementations, the imaging system 400 can include some or all of the features described in reference to FIGS. 7-12. Accordingly, the object 402 can be illuminated by a coherent beam 404a so as to allow formation of an image at least partially resulting from reflection of the coherent illumination beam 404a.

In the example shown in FIG. 16A, wavefronts (represented as 406a) associated with the imaging beam 404a are depicted as being approximately parallel to a plane defined by the object 402. For such an example nadir imaging configuration, a side lobe 414a of an intensity image obtained by an imaging sensor of the system 400 can provide information (including phase information) of a central portion 416a of the object's spectrum 410a in Fourier space. Two-dimensional representations of the same are indicated as 420a (object's spectrum), 424a (central portion), 422a (transform), and side lobe (426a).

In certain implementations, and as shown in FIG. 16A, the side lobe portion 426a of the two-dimensional transform 422a can be extracted and utilized for constructing the object's spectrum along with other side lobe portions. In FIG. 16A, a Fourier representation of the constructed image 430 is depicted as having the extracted side lobe 432a from the transform 422a. In certain implementations, the extracted side lobe 432a can be stored (arrow 428) for later analysis such as image construction. In certain implementations, such obtaining of extracted side lobe and construction of an image can be performed in substantial real time as the extracted side lobe is obtained.

In FIG. 16B, the imaging system 400 is depicted as having moved from the example orientation of FIG. 16A. Thus, an imaging beam 404b illuminating the object 402 has wavefronts (represented as 406b) that are tilted from the first wavefront (406a) of FIG. 16A, and thus the example surface of the object 402. Such a tilt is depicted as an arrow 408.

As described herein (e.g., in reference to FIGS. 20-22), a tilt in spatial space can correspond to a translation in Fourier space. Thus, the tilt of the imaging beam 404b is depicted as corresponding to a translation of the side lobe's (414b) representation of a portion (416b) of the object's spectrum 410b in Fourier space. Referring to FIGS. 16A and 16B, one can see that the tilt 408 of the imaging beam 404 results in the side lobe's representation being translated in the object's spectrum 410.

As with the example described in reference to FIG. 16A, the side lobe portion 426b of the two-dimensional transform 422b can be extracted and utilized for constructing the object's spectrum along with other side lobe portions. In FIG. 16B, a Fourier representation of the constructed image 430 is depicted as having the extracted side lobes 432a, 432b from the transforms 422a, 422b.

The example tilt of the imaging beam 404 to yield the example translation of the side lobe representation on the object's spectrum can be extended further. FIG. 16C shows an example imaging situation where five of such images are obtained by the imaging system 400 at imaging beam orientations 404a-404e relative to the object 402. Accordingly, side lobe portions of the corresponding two-dimensional transforms can be extracted and utilized for constructing the object's spectrum. In FIG. 16C, a Fourier representation of the constructed image 430 is depicted as having extracted side lobes 432a-432e from their corresponding transforms.

Generally, each of the five example images obtained by the imaging system 400 at the five orientations can be independent from the other images. Thus, the extracted two-dimensional side lobes may or may not provide continuity when they are combined to form a synthesized image. As described herein, such a continuity or matching of the extracted side lobes can be facilitated by use of one or more additional side lobes that provide overlaps. However, it will be understood that an image can still be obtained without use of such overlapping side lobes. For example, a phase of one side lobe can be digitally manipulated with respect to another side lobe until an acceptable result is obtained. Such digital manipulation can yield, for example, an imaging having improved contrast and/or resolution.

In certain implementations, such a continuity or matching of first and second extracted side lobes can be facilitated by obtaining an additional side lobe that overlaps with both of the first and second side lobes. Thus, in an example depicted in FIG. 17, images obtained at orientations 444a-444d that are interleaved between the orientations 404a-404e can result in extracted side lobes 442a-442d that interleave and overlap the extracted side lobes 432a-432e.

As with the extracted side lobes 432a-432e, images corresponding to the interleaved side lobes 442a-442d can be independent images. Thus, the interleaved side lobes 442a-442d may or may not provide continuity among themselves or with the first set of extracted side lobes 432a-432e. Such variations among the independent images can arise from factors such as imaging sensor motion and aberrations in the medium (e.g., atmosphere) between the object and the imaging sensor; and can be characterized in a number of ways, including by way of low-order Zernike polynomials.

In certain implementations, a number of algorithms can be utilized to bootstrap a set of extracted side lobes (e.g., 432a-432e and 442a-442d) by utilizing the various overlaps in the side lobes. Such a process can allow one side lobe to act as a base, and other side lobes can "bootstrap" onto it so as to yield a bootstrapped set of side lobes that yield an improved-resolution image.

For the purpose of description, "bootstrap" or "bootstrapping" can include situations where one set of data is normalized, adjusted or made to be comparable, with respect to one or more parameters, to another set of data. In the context of side lobes described herein, such one or more parameters can include a phase associated with the information contained in a side lobe, such that bootstrapping can include adjustment of the phase of one side lobe to substantially match the phase of that side lobe to another side lobe.

In certain situations, "bootstrap" or "bootstrapping" can include extending such adjustments to one or more other side lobes, such that the resulting side lobes have substantially same low-order phases based on a reference provided by one of their own, and not having to rely on an external reference.

Figure 18A:
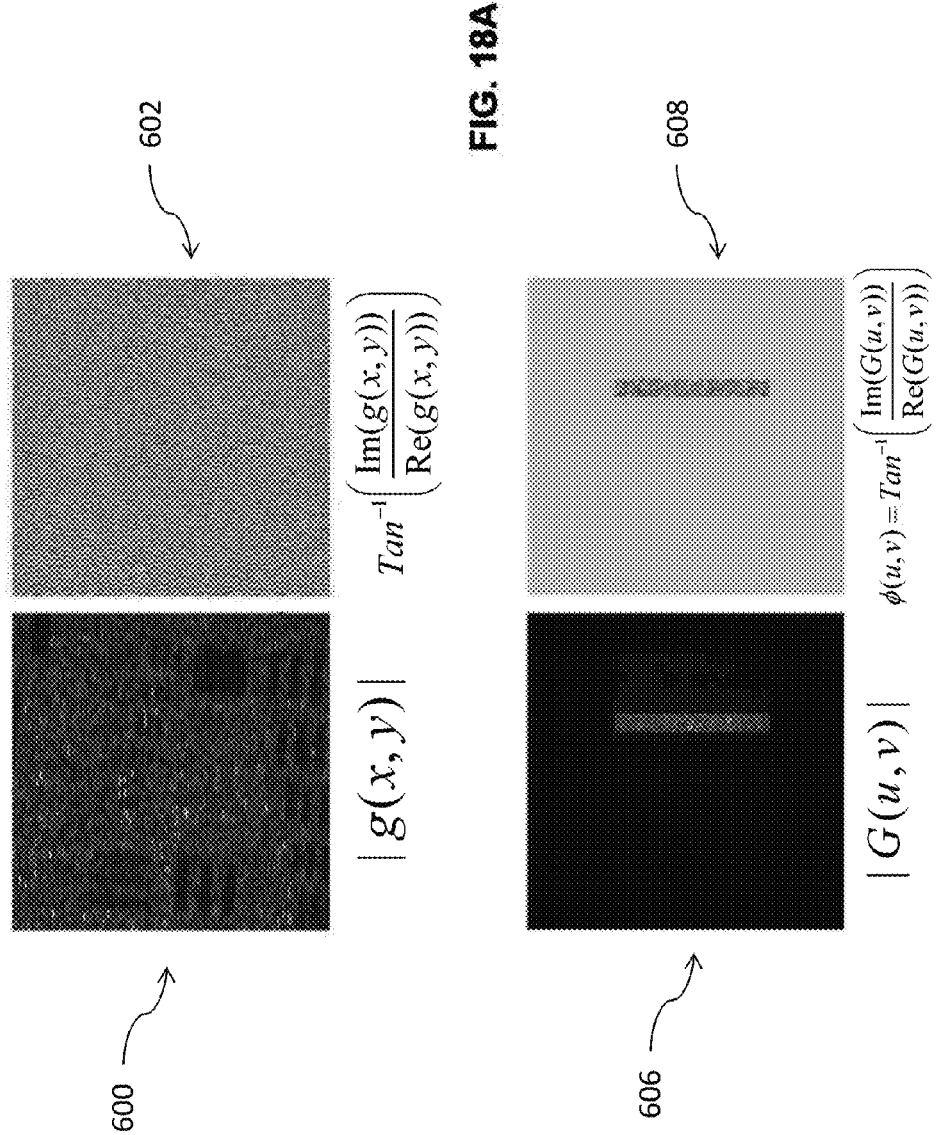

FIGS. 18A-18H show an example of such a bootstrapping process. For the purpose of description, and by way of an example, suppose that a complex image g(x,y) is processed from intensity-only data obtained from an imaging sensor (e.g., 238 in FIG. 7). The upper left panel of FIG. 18A depicts an image 600 representative of the modulus (|g(x,y)|) of the complex image. The upper right panel depicts a phase-image 602 representative of the phase ($\tan^{-1}[Im(g(x,y))/Re(g(x,y))]$) of the complex image.

As described herein, Fourier transform of the complex image, F(g(x,y)), can be represented as G(u,v). The lower left panel of FIG. 18A depicts the modulus (|G(u,v)|) 606 of the sub-aperture, and the lower right panel depicts the phase 608, $\phi(u,v)=\tan-1 [Im(G(u,v))/Re(G(u,v))]$, of the sub-aperture.

Figure 18D:
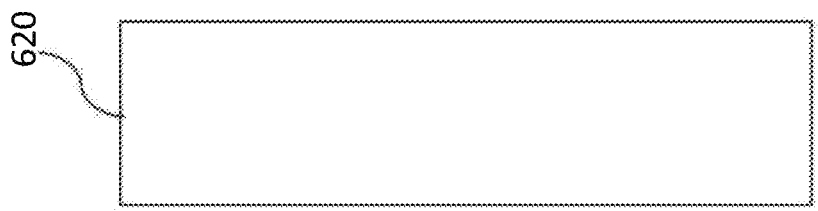
Figure 18C:
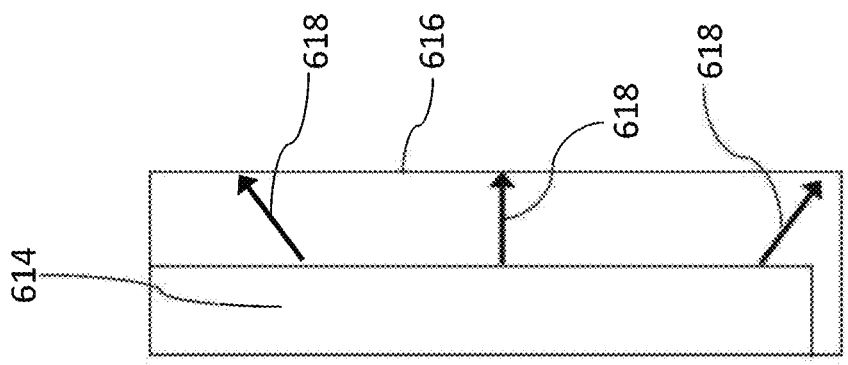
Figure 18B:
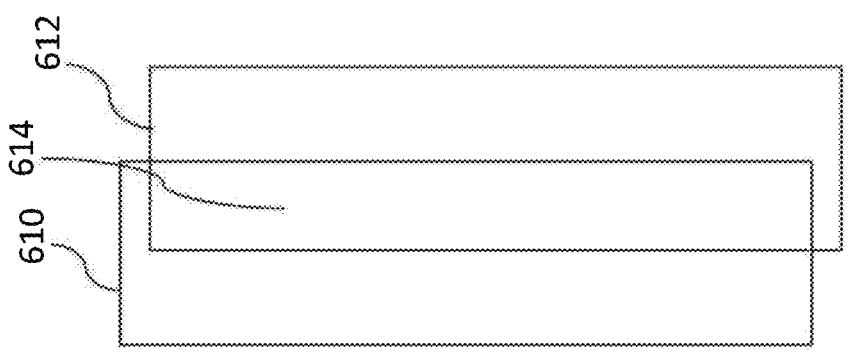

FIG. 18B shows two of such sub-apertures 610, 612 offset for the purpose of description, and having an overlap region 614. The example of the offset sub-apertures 610, 612 also show that extrapolation methodologies as described herein can be in one or more dimensions. Phase difference between the two sub-apertures 610, 612 can be calculated as $\phi_{diff}(u,v)=\phi_2(u,v)-\phi_1(u,v)$, where $\phi_1(u,v)$ and $\phi_2(u,v)$ represent the first and second sub-apertures 610, 612, respectively. In certain implementations, such a difference can be calculated in the area of overlap 614 and one or more of the low-order Zernikes (e.g., one or more of piston, tip, tilt, focus, etc.) can be projected out to form $\phi_{diff-overlap\_low-order}(u,v)$.

FIG. 18C shows that the low-order phase difference $\phi_{diff-overlap\_low-order}(u,v)$ obtained for the overlap region 614 can be extrapolated to the substantially whole size of the second sub-aperture 612. Such an extrapolation, $\phi_{diff-overlap\_low-order}(u,v) \rightarrow \phi_{ext}(u,v)$, is depicted as arrows 618 extrapolating to a limit 616 defined by the second sub-aperture 612.

FIG. 18D shows that a bootstrapped sub-aperture 620 can be formed by adding the extrapolated phase difference $\phi_{ext}(u,v)$ to the phase $\phi_2(u,v)$ of the second sub-aperture 612, so as to yield $\phi_2^{bootstrapped}(u,v)=\phi_{ext}(u,v)+\phi_2(u,v)$. A third sub-aperture (not shown) that overlaps with the second sub-aperture 612 can be bootstrapped to the second bootstrapped sub-aperture 620 in a similar manner.

FIG. 18E shows that the foregoing example of successive bootstrapping of the sub-apertures can yield a number of sub-apertures 620, 630, 640, 650, 660, 670 that are bootstrapped relative to the first sub-aperture 610. FIG. 18F shows that non-overlapping one of such bootstrapped sub-apertures can be selected so as to represent a synthesized aperture. In the example shown, the bootstrapped sub-apertures 630, 650, 670 are depicted as being non-overlapping so as to be selected with the first sub-aperture 610 to represent a synthesized aperture.

The foregoing example method of adjusting the phases (e.g., low-order phases) of sub-apertures relative to a reference phase (e.g., the first sub-aperture) can be graphically depicted in one dimension as in FIGS. 18G and 18H. A phase 702 of a reference sub-aperture is depicted as a line 700. Phases (704, 706, 708, 710) corresponding to other sub-apertures are depicted as being different from the reference phase before the bootstrapping process. After the bootstrapping process, the phases (712, 714, 716, 718, 720) are depicted as being aligned so as to allow formation of an image having a synthesized aperture.

In certain implementations such as in an aircraft flying over an object being imaged, a series of overlapping images can be obtained during a pass. Based on the foregoing bootstrapping example described in reference to FIG. 18, precise monitoring and/or calculation of the imaging sensor/object geometry during the pass can be reduced; and in some situations, may be greatly mitigated. During the bootstrapping process, extrapolations of the differences observed in the overlapping regions can be performed appropriately so as to yield an appropriate collection of sub-apertures for synthesized-aperture imaging.

Referring to the previously mentioned property where a tilt in spatial space can correspond to a translation in Fourier space, a desired translation amount can be selected so as to yield a desired separation of the side lobe. Based on such a property, images of the object can be obtained at selected imaging sensor/object geometries that would provide reconstruction of a desired range the object's spatial frequency. Thus, in certain implementations, a single pass over a target object can include obtaining of images at tilt orientations that would allow such reconstruction.

Figure 19A:
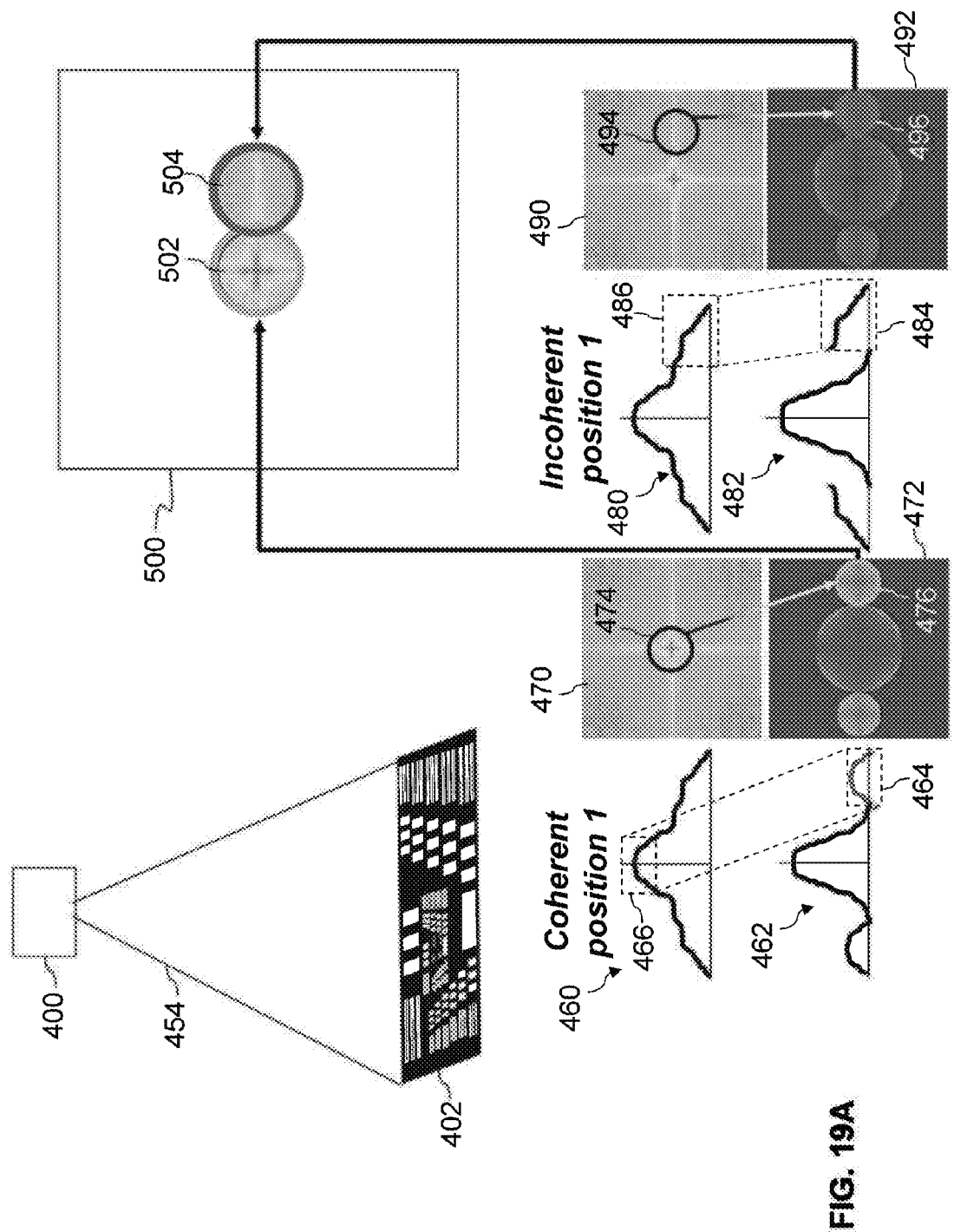

FIG. 19A shows that in certain implementations, matching or bootstrapping of side lobe representations can be achieved in one or more other ways. In the example shown, an imaging system 400 can be configured to obtain both coherent and incoherent images of an object 402 at a given tilt orientation 454 ("position 1"). The coherent image can be obtained by forming an image resulting from illumination by an illumination beam; and the incoherent image can be obtained by an image formed by incoherent light (e.g., reflection of ambient or directed light, light emitted from the object or by manipulation of the coherent return itself).

As described herein in reference to FIGS. 14 and 15, a side lobe (484) resulting from incoherent imaging corresponds to a non-central portion (486) of the object's spectrum (480) when the imaging beam orientation is perpendicular to the object's surface. In the same orientation, a side lobe (464) resulting from coherent imaging corresponds to a central portion (466). Thus, extraction of the coherent-imaging side lobe (476 in two-dimensional representation 472) and the incoherent-imaging side lobe (496 in two-dimensional representation 492) can provide information about two neighboring portions 502, 504 for a Fourier space image 500 being constructed.

Whereas in the coherent imaging configuration of FIG. 16 resulted in independent side lobe images due to different imaging times and/or orientations, the substantially simultaneously obtained coherent and incoherent images yield the foregoing neighboring side lobes that are interdependent with each other. Thus, the two side lobe images contain information that are matched or bootstrapped to each other.

In FIG. 19B, the imaging system 400 is depicted as having moved to a second location so as to yield a tilt orientation 454b. Coherent and incoherent images obtained at such an orientation ("position 2") can yield a coherent side lobe (464b) that is related to the incoherent side lobe of the previous position ("position 1"). At the second position, an incoherent side lobe image is translated from the coherent side lobe image, and is interdependent with the second coherent side lobe image. The second incoherent side lobe image can then be used to match with a coherent side lobe image at a third tilt orientation (not shown). Such a bootstrapping method can continue as needed or desired.

Figure 19C:
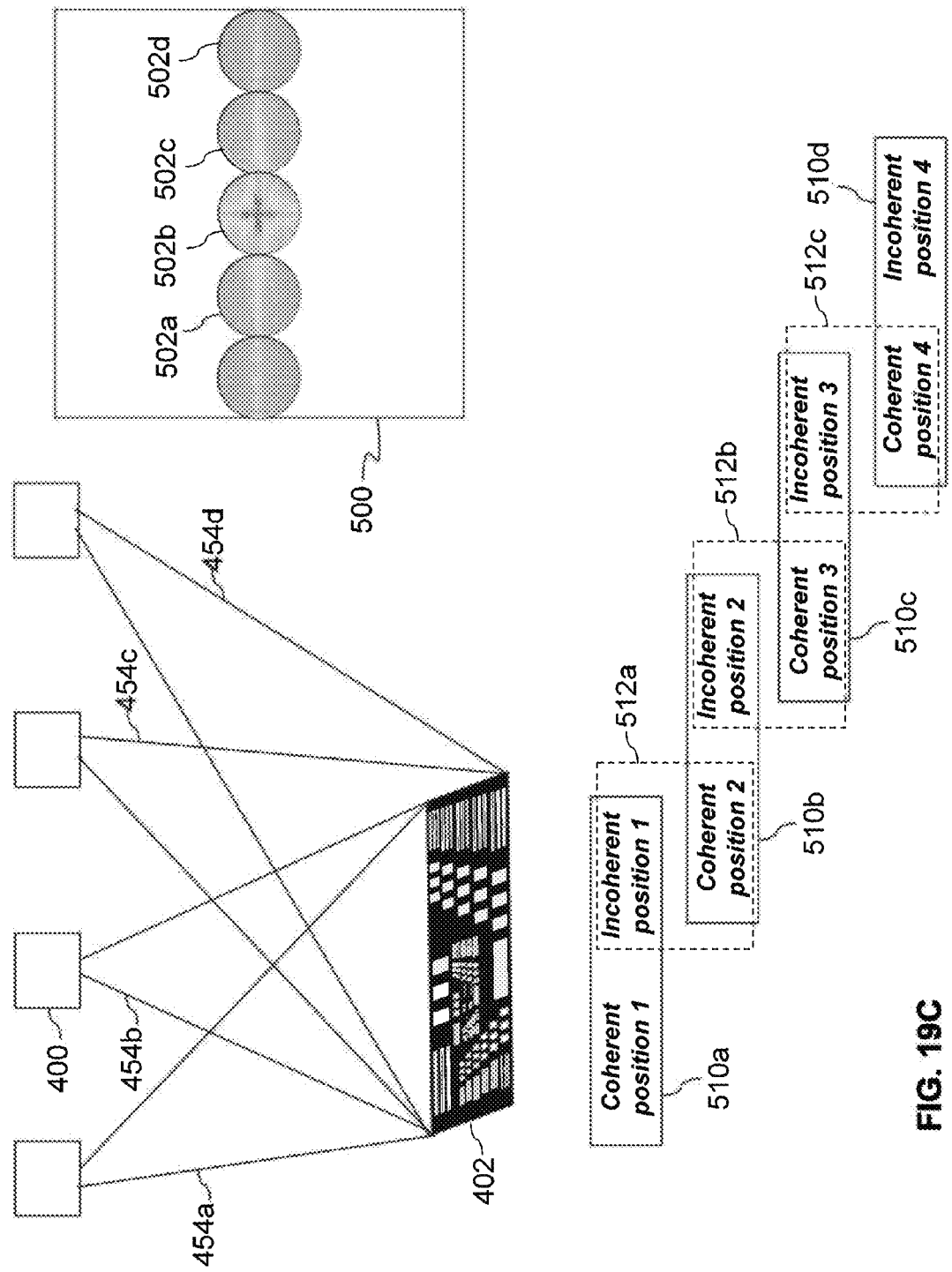

FIG. 19C depicts an extension of the two-tilt example described in reference to FIGS. 19A and 19B. The imaging system is depicted as obtaining coherent and incoherent images, substantially simultaneously, at a number of tilt orientations (454a-454d). At each tilt orientation, the coherent and incoherent side lobe images are interdependent, as depicted by solid-line boxes 510a-510d. Between two neighboring tilt orientations, the incoherent side lobe image of the first orientation is depicted as being match-able (e.g., containing similar information) with the coherent side lobe image of the second orientation, as depicted by dashed-line boxes 512a-512c. Based on such matching or bootstrapping of images obtained at various orientations, a matched image having a number of side lobe images can be constructed.

Figure 23:
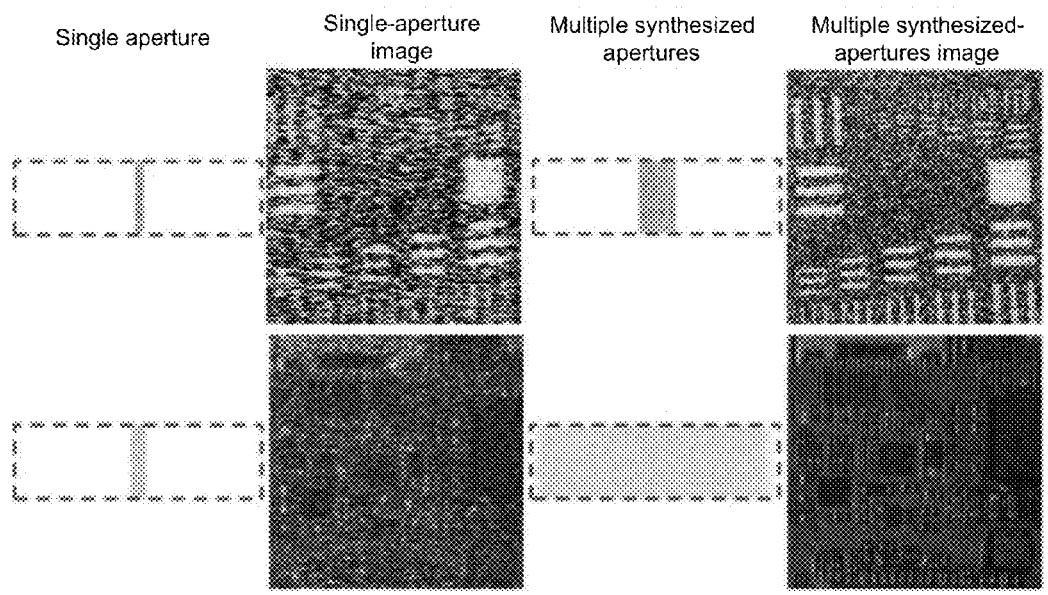
FIG. 23 shows a comparison of resolution performances of processed images obtained via methods involving (a) laterally moving the aperture and (b) rotating the object to provide respective spatially homodyned images.
Figure 24:
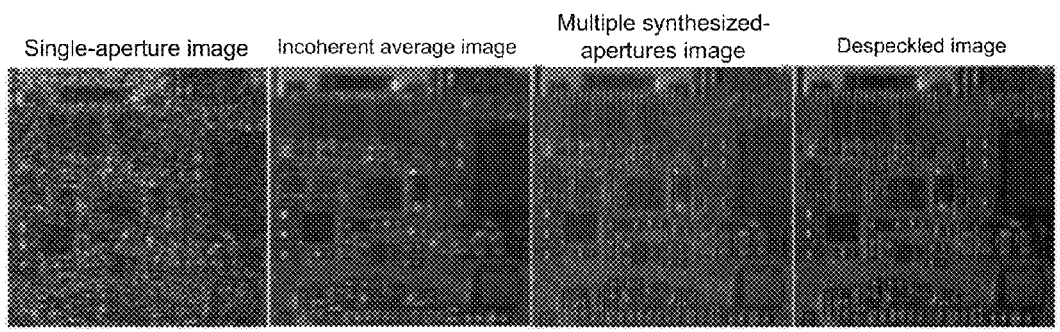
FIG. 24 shows a comparison of resolution performances between an image generated by incoherent-imaging and a synthesized image generated by the rotated object methodology of FIG. 23.
Figure 25:
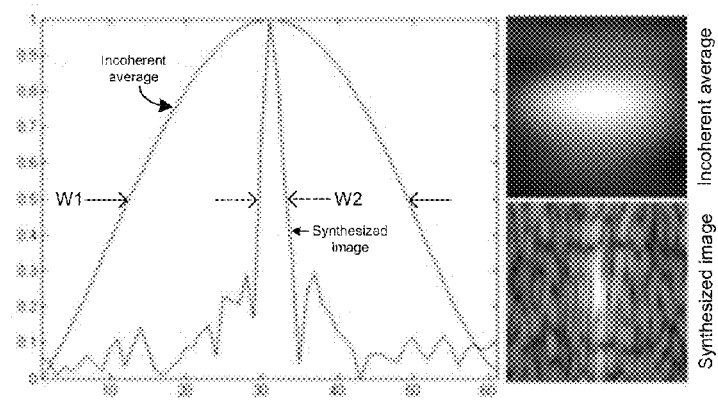
FIG. 25 shows an example of improvement that can be achieved in the synthesized image of the example methodology of FIG. 24.

As described herein in reference to FIGS. 4A-4D, different types of relative motions between an object and an imaging system can yield sub-aperture complex images having different phase information, so as to allow formation of a combined image having higher resolution. FIGS. 20-25 show how one type of relative motion can be utilized to simulate another type of relative motion, to introduce shift in Fourier (frequency) space where the motion between the location of the object and the imaging system itself does not change. FIGS. 23-25 show examples of imaging performance that can be provided by such a configuration.

Figure 20:
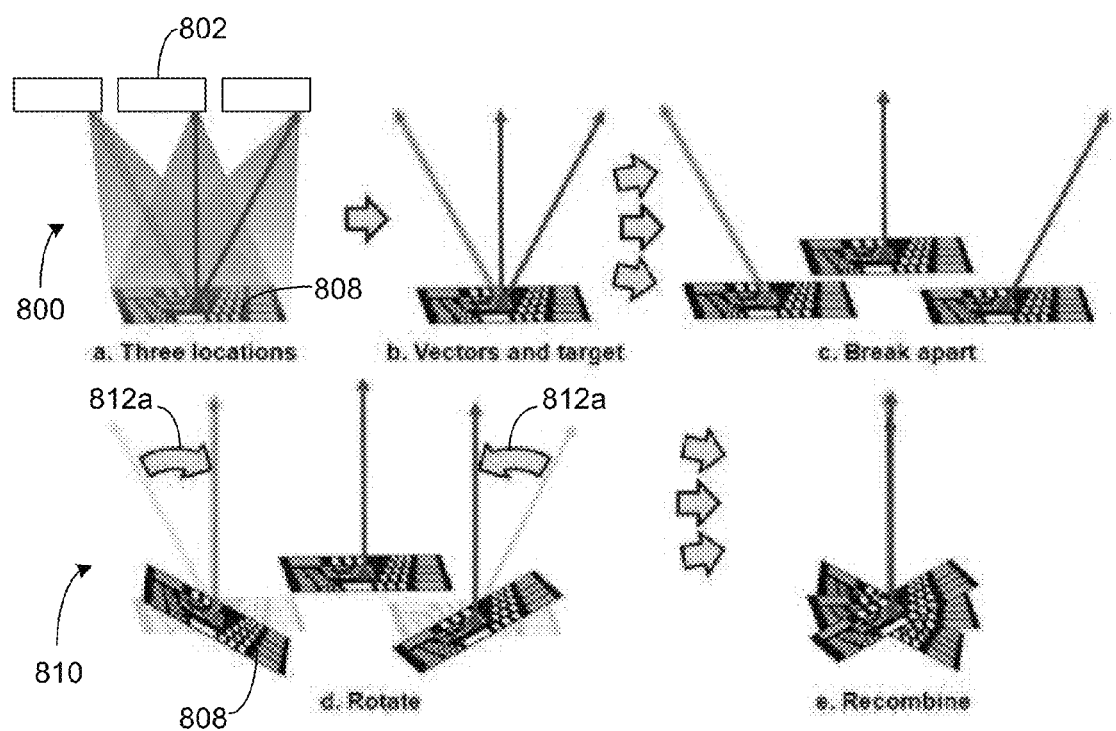
FIG. 20 shows that motion of an imaging system relative to an object can be approximated by a rotation of the object.

FIG. 20 shows that in certain implementations, a rotating-object configuration (e.g., FIG. 4C) can be analogous to a configuration where an imaging system is moving relative to a stationary object (e.g., FIG. 4A). In FIG. 20, the latter is depicted as configuration 800, and the former is depicted as configuration 810.

In the example imaging configuration 800, an imaging system 802 is depicted as moving relative to a stationary target object 808 and obtaining images at three example locations. The three imaging orientations are depicted by vectors from a location (such as center) on the target to the imaging sensor locations. The three images associated with such three imaging orientations can be processed and combined as described herein.

In certain implementations, and as shown in the example configuration 810 of FIG. 20, the target object 808 can be rotated while the imaging system remains stationary so as to yield similar imaging orientations. In the example configuration 800, the target 808 remains at substantially the same orientation, and the target-to-imager vectors are pointing in different directions due to the moving imaging system 802. In the example configuration 810, the target-to-imager vectors can be made to substantially align towards a stationary imaging system (not shown) by rotations (e.g., arrows 812a, 812b). The amounts of rotations can be selected so that the vectors substantially align (e.g., substantially parallel to each other). For example, rotations 812a and 812b are shown to align the vectors with the middle vector. The angles between the vectors are the same in the two example configurations 800, 810. Accordingly, similar results can be obtained for the configuration 800 and similar configurations described herein. Images obtained in such different rotation configurations can be processed and combined as described herein.

In some situations, the foregoing target-rotation configuration can provide desirable features. For example, in some laboratory situations, it can be more efficient to rotate an object than shift and rotate an imaging device. Further, such a target-rotation configuration can facilitate characterization of resolution capabilities and/or self-contained introduction of shift in Fourier space when the relative motion between the target location and the imaging system generally does not yield such a shift.

As described in reference to FIG. 11, the example configuration 930 (where the aperture 908 is movable laterally), a limitation in Fourier space can be imposed physically by the finite lateral dimension of the optics (e.g., size of lens and/or pupil), and/or mathematically by the area in Fourier space in which the side lobes are allowed to occupy. As also described in reference to FIG. 12, the example configuration 940 (where the object 226 is rotatable), side lobes can take up substantially all of the available Fourier space not occupied by the central lobe. Accordingly, a limit in the number of apertures that may be combined can be removed or at least dramatically increased in such a configuration. Furthermore, the side lobes generally do not shift when the object is rotated.

Figure 21:
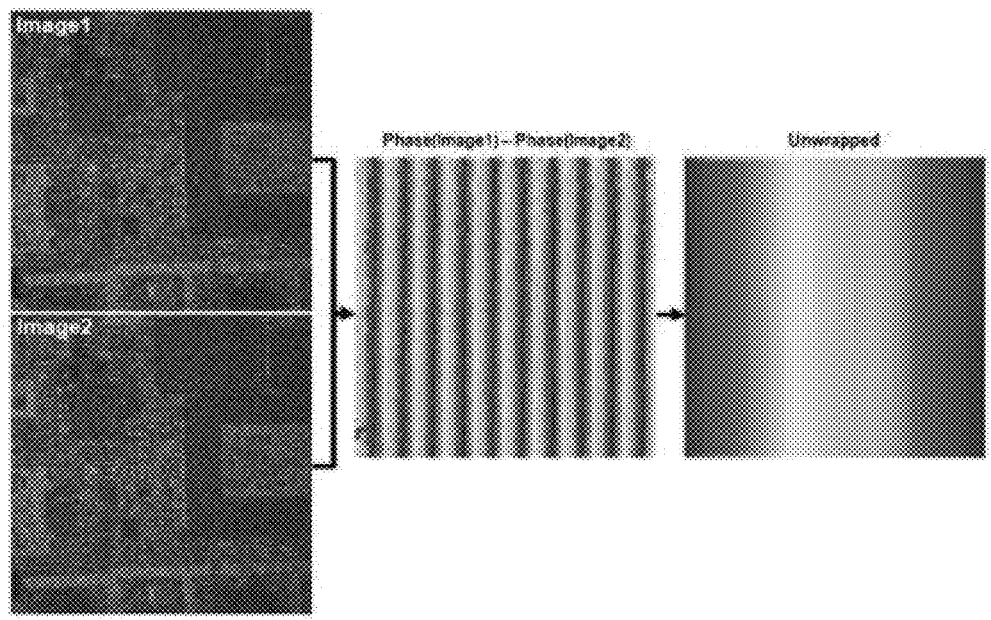
FIG. 21 shows an example of a substantially pure tilt being analyzed with images of a rotating object to facilitate characterization of motion in terms of a low-order Zernike such as tilt in image space.

As described in reference to FIG. 20, rotation of an object can be equivalent to motion (e.g., translational motion relative to the object) of an imaging pupil. Such an implied motion of the pupil that is equivalent to the rotation of the object can be verified and accounted for so as to facilitate the synthesis processes described in reference to FIGS. 17 and 18. By way of an example, FIG. 21 shows complex images from different rotation positions. The images on the left side of FIG. 21 are complex; therefore these imaged include phase information. The phase of the two images can be subtracted as shown in the middle image. The result is a set of fringes indicative of the phase, and in this case, indicative of the tilt between the two images. The amount of tilt can be ascertained. The fringes can be unwrapped and projected onto a piston-tip-tilt basis set (e.g., Zernike polynomials) in a manner similar to that described in reference to FIG. 18. The tilt image space can be determined in such a manner, and is shown in FIG. 21. The right image in FIG. 21 demonstrates that the phase difference between the two rotation images is substantially pure tilt, as expected. It is noted that in the foregoing example, such characterization of the pupil's motion (e.g., the relative tilt phase in image space between two positions) is derived from the image data without the need for additional knowledge of the target rotation. Accordingly, in certain implementations, such a self-contained motion compensation capability can also be applied to imaging configurations where an imaging system is moving relative to a stationary object (such as the example of FIG. 4A).

As discussed above, angular shift in image space corresponds to frequency shift in Fourier space. Accordingly, in certain implementations, the relative tilt and associated phase shift described in reference to FIG. 21 can introduce shift in Fourier side lobes in situations (such as rotating object) where collected side lobes generally do not shift between two imaging positions. Such introduced shifts can expand an effective aperture in Fourier space as described herein. An example of such a shift is demonstrated in FIG. 22.

Figure 22:
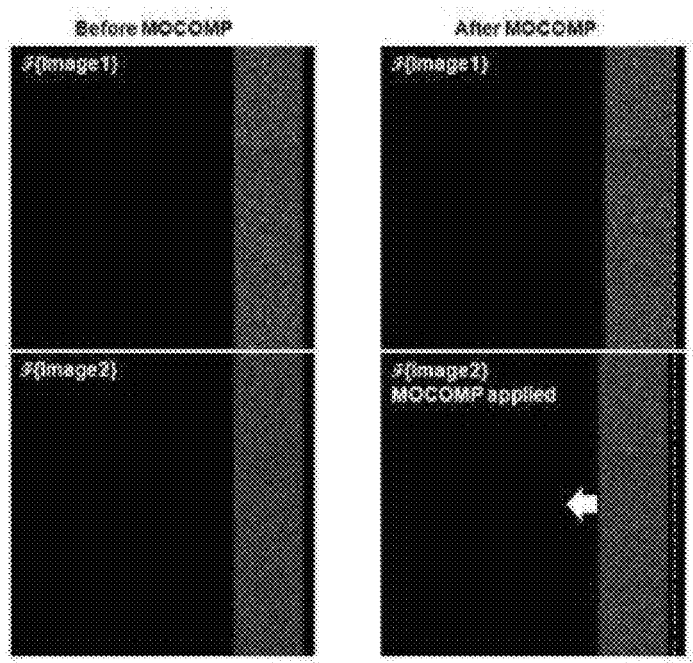
FIG. 22 shows how a phase difference in the images of FIG. 21 can be utilized to introduce a translation of a side lobe in frequency space, thereby allowing generation of higher resolution image results.

FIG. 22 shows Fourier transforms of the example images shown in FIG. 21. More specifically, the left panels of FIG. 22 shows Fourier transforms of the two left-panel images of FIG. 21. As described in reference to FIG. 12, side lobes generally do not shift in Fourier space when the object is rotated between two positions. Such an absence of translation of the side lobes is shown in the top and bottom data sets on the left side of FIG. 22 where the side lobes are aligned.

When the relative tilt phase (right panel in FIG. 21) is added to Image2 of FIG. 21 in a manner as described herein, the result is a translation in Fourier (frequency) space seen in the bottom right image of FIG. 22. Thus, the pupil plane data in the lower right panel of FIG. 22 is shown to be translated with respect to the pupil plane data in the upper right panel.

Upon introducing and decoding the object rotation (e.g., as described in reference to FIGS. 21 and 22), the information contained in Fourier transform of the processed images can be combined using the Fourier space bootstrapping techniques as described herein (see, e.g., FIGS. 16C, 17 and 18) to expand the effective aperture in Fourier (frequency) space and thereby improve the observed resolution of a resulting image. In certain implementations, a difference in phase in pupil space can represent the object's relative motion and/or effects of external influences such as atmospheric turbulence. Effects of external influences can be measured and removed or accounted for through the extrapolation of low-order aberration coefficients (e.g., Zernikes). Analyzing area of overlap of the lobes in Fourier space can assist in providing some correction. The area of overlap should represent the same information and any differences can be attributable to unwanted influences such as atmospheric turbulence. Accordingly, the effects of external influences can be analyzed as described above, for example, in connection with FIG. 18. In some imaging situations, such a correction methodology can be useful in non-laboratory settings where influences such as atmospheric turbulence can be significant, especially when encountered by sparse systems, segmented apertures, distributed apertures, and/or lightweighted optics.

FIG. 23 shows example results of improved resolution obtained by the example configurations of FIG. 11 (laterally-movable aperture) and FIG. 12 (rotatable-object). The upper portion of FIG. 23 corresponds to the laterally-movable aperture configuration, and the lower portion corresponds to the rotatable-object configuration. These results demonstrate that for both configurations, combining multiple synthesized apertures in Fourier (frequency) space can improve resolution.

In some image collection configurations, a Fourier space occupied by a single aperture can be expanded; while in other collection configurations, a Fourier space occupied by a single aperture cannot be expanded. In FIG. 23, the left column (top and bottom) depicts single apertures in their respective Fourier spaces (dashed boxes). For the example rotatable-object configuration, the dashed box represents the expanded Fourier space. For a configuration relying purely on the translating pupil, the single-aperture Fourier space is not expandable to the larger Fourier space (dashed line) that may be attainable by the imaging in other ways. The single aperture size corresponding to the laterally-movable aperture configuration (upper portion) is shown to be smaller to begin with than the single aperture size corresponding to the rotatable-object configuration (lower portion). Single-aperture images are shown to the right of the single-aperture column.

In the column indicated as "multiple synthesized apertures," the laterally-movable aperture configuration (upper portion) is shown to have a limited synthesized aperture size (e.g., due to the lateral movement limitation). The rotatable-object configuration (lower portion), on the other hand, is shown to have a synthesized aperture size that can be made larger than the original available Fourier space (not shown). Multiple synthesized-aperture images are shown on the right-most column.

Comparing the single aperture column with the multiple synthesized aperture column for the specific example shown, the laterally-movable aperture configuration shows an increase in the effective aperture width (from the single aperture width to the multiple synthesized aperture width) by a factor of about 4. For the rotatable-object configuration, such an increase is by a factor of about 10. In some imaging situations, the single apertures can impose diffraction limits in imaging resolutions. Accordingly, the foregoing improvements in resolutions can be expressed as 4-fold and 10-fold resolution increases beyond their respective diffraction limits.

FIGS. 24 and 25 show improved-resolution performance associated with the example rotatable-object configuration in the context of intensity image results. In FIG. 24, four example intensity images are shown. The left-most panel shows an image corresponding to the single aperture (rotatable-object) configuration of FIG. 23, and the middle-right panel shows an image corresponding to the multiple synthesized aperture (rotatable-object) configuration of FIG. 23. To approximate an image from an incoherent aperture having a similar size as that of the single aperture, the middle-left panel shows an incoherent average of a number of single aperture images. One can see that such an incoherent average image displays much less speckle that the single aperture image on the left. Visually, the resolution increase between the middle-left image (incoherent average image) and the middle-right image (multiple synthesized aperture image) is quite apparent with increased resolution introduced by the multiple synthesized apertures.

The far right image shows an example of despeckling that can be applied to, for example, the multiple synthesized aperture image. Such an example shows that in some implementations, despeckling can be applied to synthesized images as described herein without resulting in significant loss of resolution. Despeckling techniques such as introducing random phase as well known can be used.

FIG. 25 shows an example quantification of the resolution improvement described in reference to FIG. 24. In the example, point spread functions from a glint due to reflection from an object (electronics board) are shown. This glint is used to approximate a point source. Two different images of the glint are shown to the right for the incoherent case (top) and the synthesized case (bottom). The plots on the left shows a slice through the center of these normalized intensity data. At their full width at half maximum these plot lines differ by an approximate factor of ten, indicating the synthesized image (width W2) is about ten times sharper than the incoherent image (width W1).

It is believed that imaging methodologies described herein include features that are advantageous compared to other possible approaches. For example, spatial mixing offers advantages over temporal mixing. Temporal mixing techniques do not collect images with overlaps in Fourier space and therefore may not take advantage of all the features described herein. Spatial mixing in the image plane as disclosed herein also can offer increased field of view compared to spatial mixing methods that occur in the pupil plane.

Figure 17:
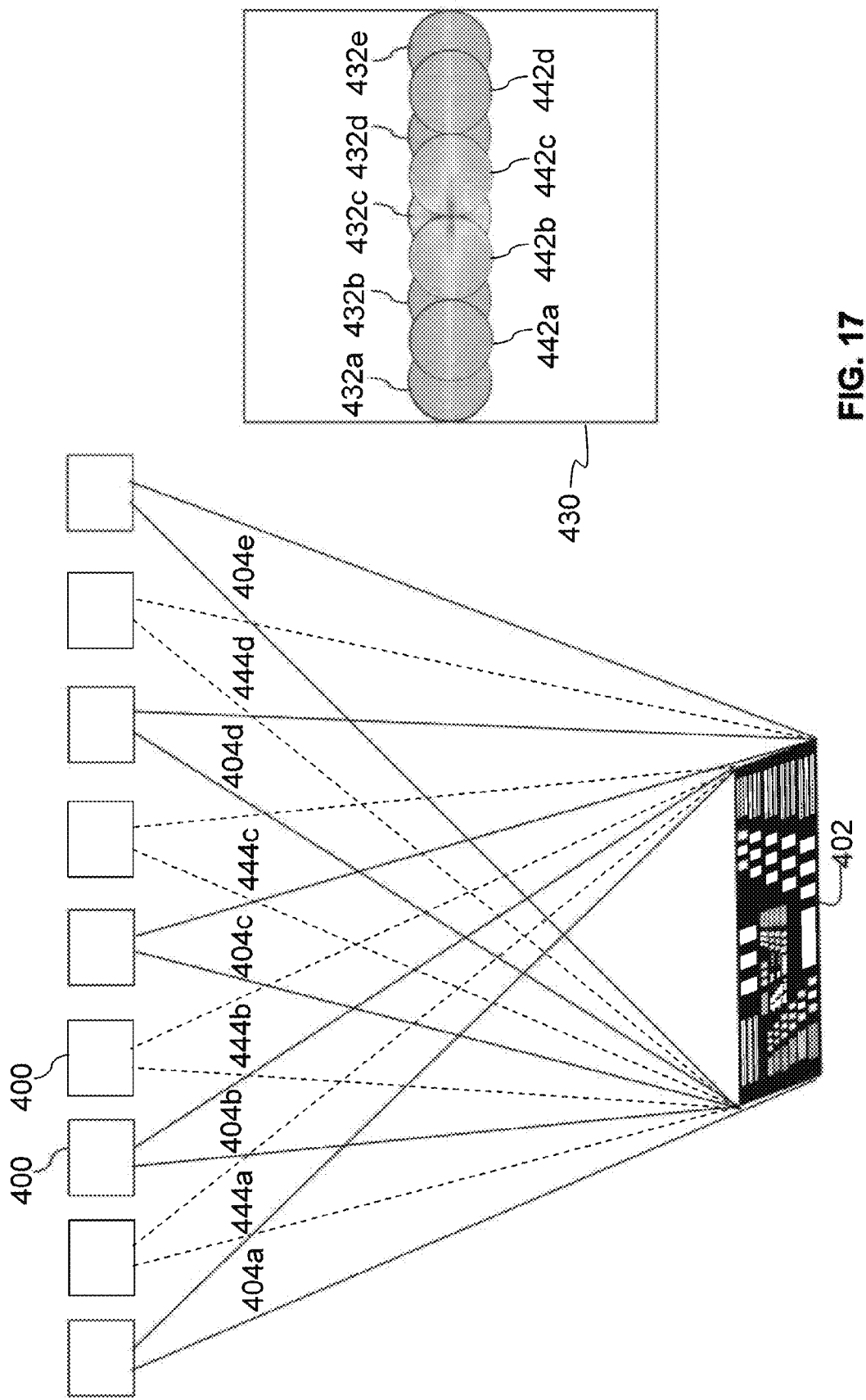
FIG. 17 shows an example of how the side lobes of the coherent Fourier space distributions of FIGS. 16A-16C, which are generally independent, can be made to be to be inter-dependent by use of additional coherent side lobes that overlap the independent side lobes.

As described herein, FIGS. 11 and 17 show examples where motion of an aperture (or pupil) of an imaging system relative to an object can result in a series of overlapping extracted side lobes in Fourier space. The example methodologies described in reference to FIG. 18 can then bootstrap such extracted side lobes in Fourier space so as to yield a high resolution image associated with a larger aperture. Accordingly, in some implementations, such a methodology can be considered to be motion compensation in pupil-space. In such a methodology, the pupil-space motion compensation can account for image-space blurring and relative movement.

As also described herein, FIGS. 12, 21 and 22 show examples where rotation of an object relative to an imaging system can result in a series of overlapping extracted side lobes in Fourier space, even though the rotational motion of the object itself does not cause a shift in Fourier space. Such a shift is described herein as being induced by, for example, obtaining phase differences of complex images and decoding such a difference. Extrapolation of such a decoded phase difference using one or more low order Zernikes can be applied to the image. Accordingly, in some implementations, such a methodology can be considered to be motion compensation in image-space. In such a methodology, the image-space motion compensation can define locations of the pupil at different orientations (and can yield a shift of an image in Fourier space).

In some implementations, the phase difference calculation and extrapolation methodology applied for the image-space motion compensation can be performed in similar manners as those described herein.

The foregoing examples of pupil-space motion and image-space motion can be considered to be components that can be present in real-life imaging situations. More particularly, such imaging situations may involve both motion of a pupil (relative to an object) of an imaging system, as well as relative motion of images. For example, suppose that an aircraft with an imaging system flies over a target and obtains a number of images of the target at different orientations. Such a series of different orientations will likely involve both the pupil-movement component and the image-movement component.

Accordingly, in some implementations, it may be desirable to perform motion compensations to account for both types of motions. Depending on a given image collection architecture, it may be advantageous to perform one motion compensation first before the other motion is calculated.

Figure 26:
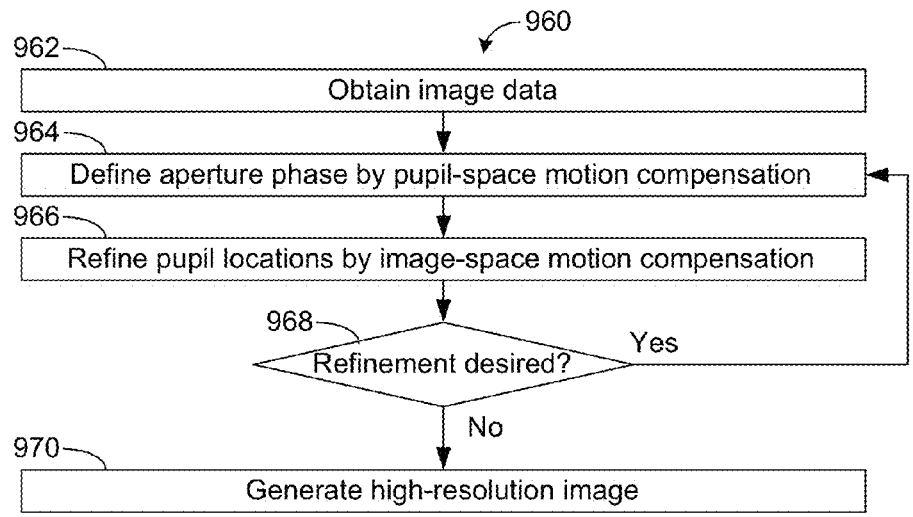
FIGS. 26 and 27 show example processes that can be implemented to obtain high-resolution images by different example combinations of pupil-space motion compensation and image-space motion compensation as described herein.

By way of an example, FIG. 26 shows a process 960 where pupil-phase can be calculated first. In block 962, aperture phase can be defined by first performing pupil-space motion compensation. In block 964, further refinement in pupil locations can be obtained by performing image-space motion compensation. If further refinement is desired ("Yes" in decision block 968), then additional pupil-space motion compensation can be performed again (block 964) so as to define phase associated with, possibly, a larger synthesized aperture. If further refinement is not desired ("No" in decision block 968), then a high-resolution image can be generated in block 970.

Figure 27:
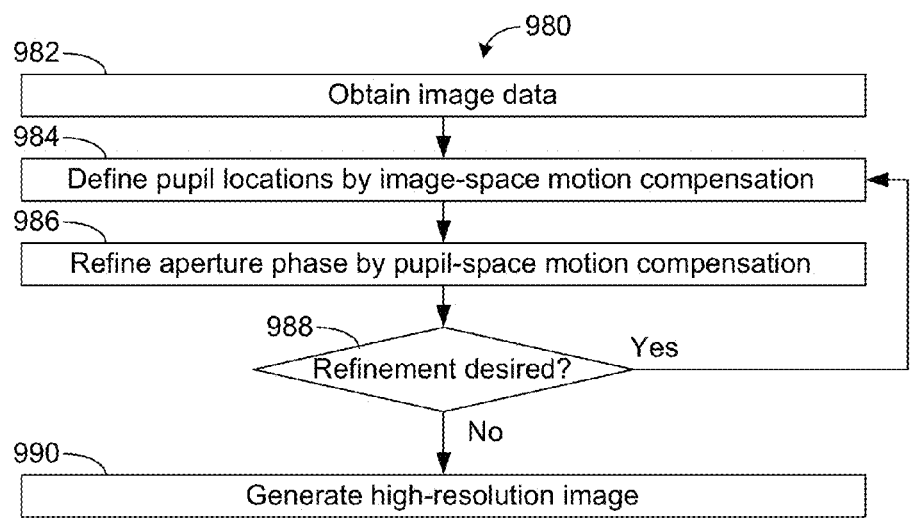

By way of another example, FIG. 27 shows a process 980 where image-phase can be calculated first. In block 982, pupil locations can be defined by first performing image-space motion compensation. In block 984, further refinement in aperture phase can be obtained by performing pupil-space motion compensation. If further refinement is desired ("Yes" in decision block 988), then additional image-space motion compensation can be performed again (block 984) so as to define pupil locations associated with, possibly, a larger synthesized aperture. If further refinement is not desired ("No" in decision block 988), then a high-resolution image can be generated in block 990.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation (s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for imaging, the method comprising:
    forming a collective image, the forming comprising:
        providing an illumination beam to an object so as to yield interaction light resulting from interaction between the illumination beam and the object;
        directing at least some of the interaction light as an imaging beam to an imaging sensor so as to form an image of the object on the imaging sensor; and
        interfering at least a portion of the interaction light with a reference beam thereby forming an interference pattern imaged on the image sensor, the interference pattern combining with the image of the object at the imaging sensor to form the collective image having a Fourier transform that includes a side lobe in Fourier space, the side lobe having phase information about a range of the object's spatial frequencies; and
    repeating the forming at different orientations between the imaging beam and the object until a plurality of collective images are obtained, each of the collective images having a different range of the object's spatial frequency.

2. The method of claim 1, further comprising generating and extracting a side lobe to yield a sub-aperture for each of the plurality of collective images.

3. The method of claim 2, wherein the generating of the side lobe comprises applying a Fourier transform to the collective image.

4. The method of claim 2, further comprising combining the sub-apertures to yield a synthesized aperture.

5. The method of claim 4, further comprising generating an intensity image corresponding to the synthesized aperture.

6. The method of claim 5, wherein the intensity image has a resolution that exceeds the resolution capability associated with each sub-aperture.

7. The method of claim 4, wherein each of the sub-apertures resulting from the collective images overlaps with one or more of its neighboring sub-apertures.

8. The method of claim 7, wherein the combining comprises:
    selecting a first sub-aperture;
    identifying a region of overlap in phases of the first sub-aperture and a second sub-aperture;
    calculating a difference in the phases within the region of overlap; and
    adjusting the phase of the second sub-aperture based on the calculated difference to yield an adjusted phase for the second sub-aperture that is substantially in phase with the first aperture.

9. The method of claim 8, wherein the combining further comprises repeating the identifying, calculating, and adjusting with one or more sub-apertures relative to one or more of the first and second sub-apertures.

10. The method of claim 9, wherein the combining further comprises selecting phase-adjusted sub-apertures that represent substantially contiguous ranges of the object's spatial frequency to form the synthesized aperture.

11. The method of claim 1, wherein the reference beam comprises a coherent light beam.

12. The method of claim 11, wherein the reference beam originates from a source that also generates the illumination beam.

13. The method of claim 12, wherein the reference beam is separated from the illumination beam and provided to the imaging sensor.

14. The method of claim 11, wherein the reference beam originates from the interaction light.

15. The method of claim 1, wherein the illumination beam comprises a coherent light beam.

16. The method of claim 15, wherein the coherent beam comprises a laser beam.

17. The method of claim 16, wherein the laser beam includes a frequency in a visible spectrum.

18. The method of claim 1, wherein the different orientations between the imaging beam and the object are introduced by moving an aperture that the imaging beam passes through along a direction having a lateral component relative to the imaging beam's optical axis.

19. The method of claim 1, wherein the different orientations between the imaging beam and the object result from rotating the object relative to the imaging beam.

20. The method of claim 1, wherein the different orientations between the imaging beam and the object result from moving a platform on which the image sensor is disposed.

21. The method of claim 1, further comprising recording the plurality of collective images so as to allow subsequent retrieval and analysis of the collective images.

22. The method of claim 1, wherein interaction between the illumination bean and the object comprises reflection of the illumination beam from the object.

23. The method of claim 1, wherein at least one of the actions recited is performed by one or more processors.

24. The method of claim 1, further comprising using one or more non-transitory computer readable media comprising computer instructions to cause one or more computer processors to generate an image having a resolution higher than the resolution of said collective images by using information obtained from said plurality of collective images.

25. An imaging system, comprising:
a coherent light source configured to generate an illumination beam;
an optics assembly configured to deliver the illumination beam from the coherent light source to an object and to gather interaction light from interaction between the illumination beam and the object and form an image of the object; and
an imaging sensor positioned and configured to allow recording of the image,
wherein the optics assembly is further configured to provide a reference beam to the image sensor, the reference beam combining with the image of the object at the imaging sensor to form a collective image having a Fourier transform that includes a side lobe in Fourier space, the side lobe having phase information about a range of the object's spatial frequency.

26. The system of claim 25, further comprising a non-transitory computer readable medium configured to allow storage of the collective images.

27. The imaging system of claim 26, further comprising a controller configured to control acquisition of a plurality of different collective images.

28. A movable craft having the imaging system of claim 25.

29. The movable craft of claim 28, wherein the movable craft includes an aircraft, a spacecraft, a watercraft, or a landcraft.

* * * * *